April 5, 1966 P. L. RANDLEV 3,245,045
INTEGRATED DATA PROCESSING SYSTEM
Filed Nov. 21, 1961 12 Sheets-Sheet 1
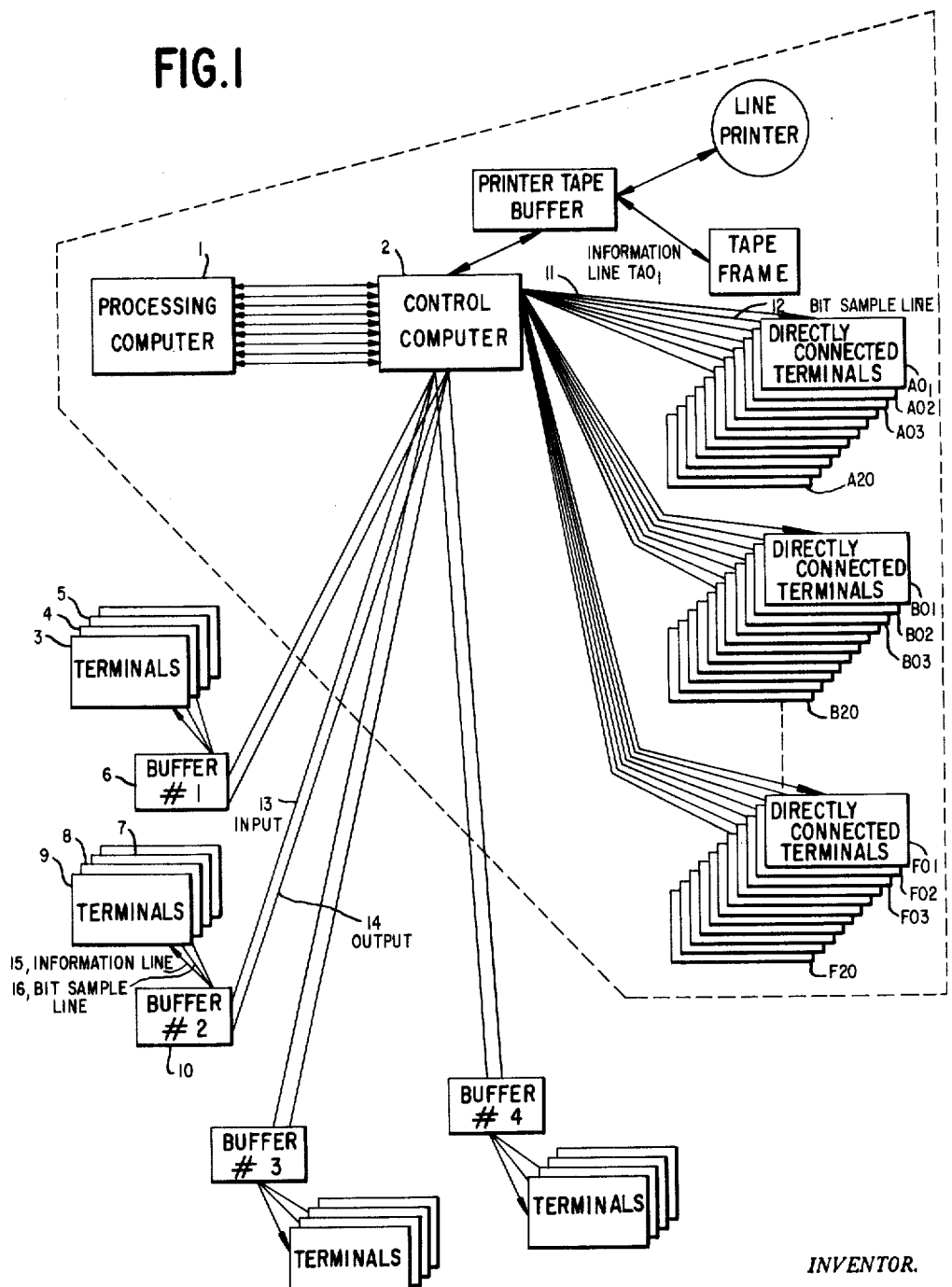
INVENTOR.
PETER L. RANDLEV
BY
Sughrue, Rothwell, Mion & Zinn
ATTORNEYS April 5, 1966   P. L. RANDLEV   3,245,045
INTEGRATED DATA PROCESSING SYSTEM
Filed Nov. 21, 1961   12 Sheets-Sheet 2

TERMINAL CONTROLS

April 5, 1966  P. L. RANDLEV  3,245,045
INTEGRATED DATA PROCESSING SYSTEM
Filed Nov. 21, 1961  12 Sheets-Sheet 4

TERMINAL BUFFER

April 5, 1966     P. L. RANDLEV     3,245,045
INTEGRATED DATA PROCESSING SYSTEM
Filed Nov. 21, 1961                          12 Sheets-Sheet 5
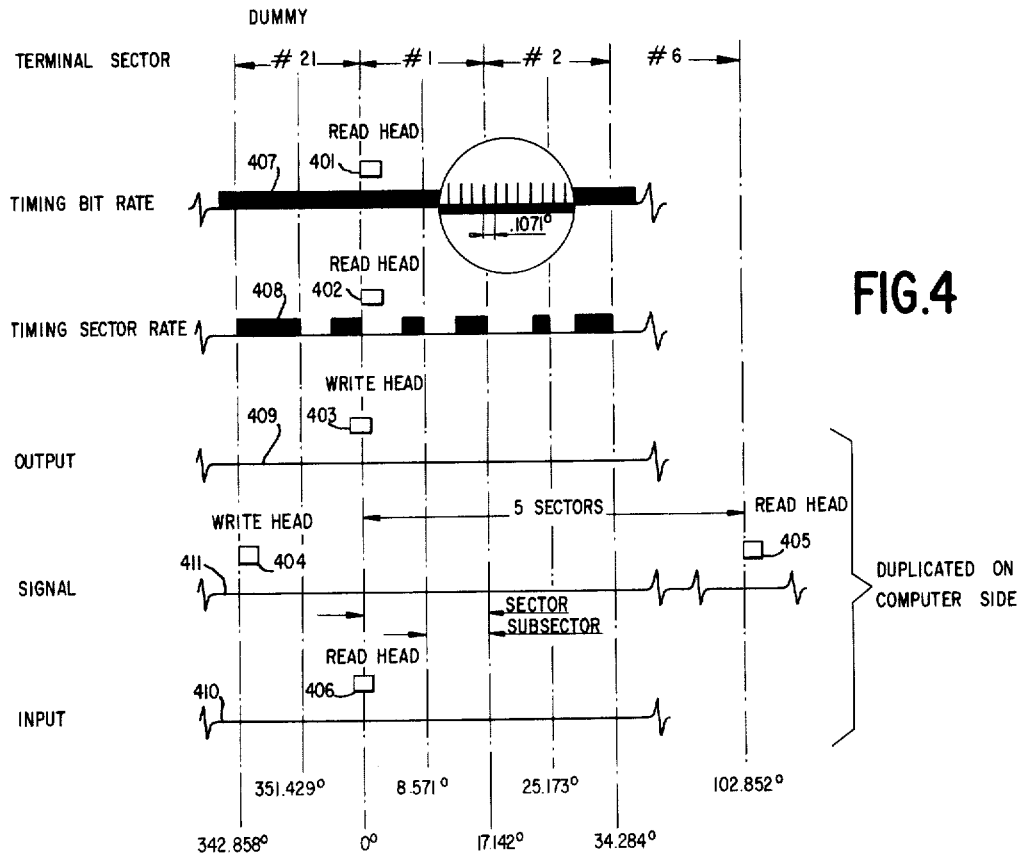
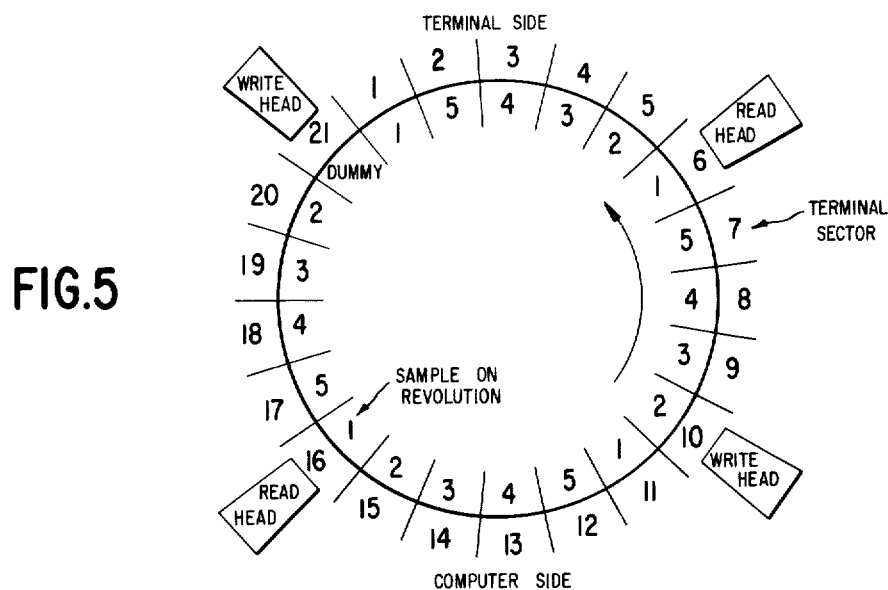

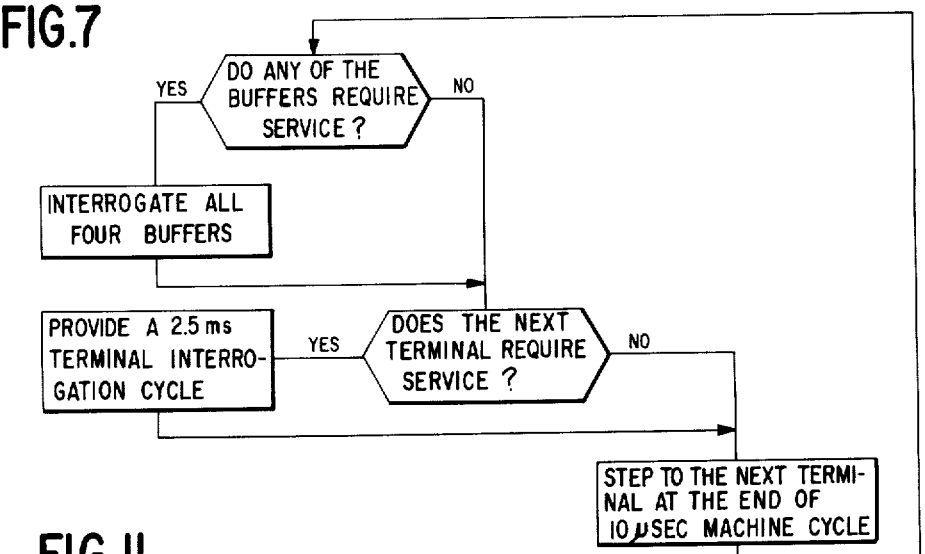
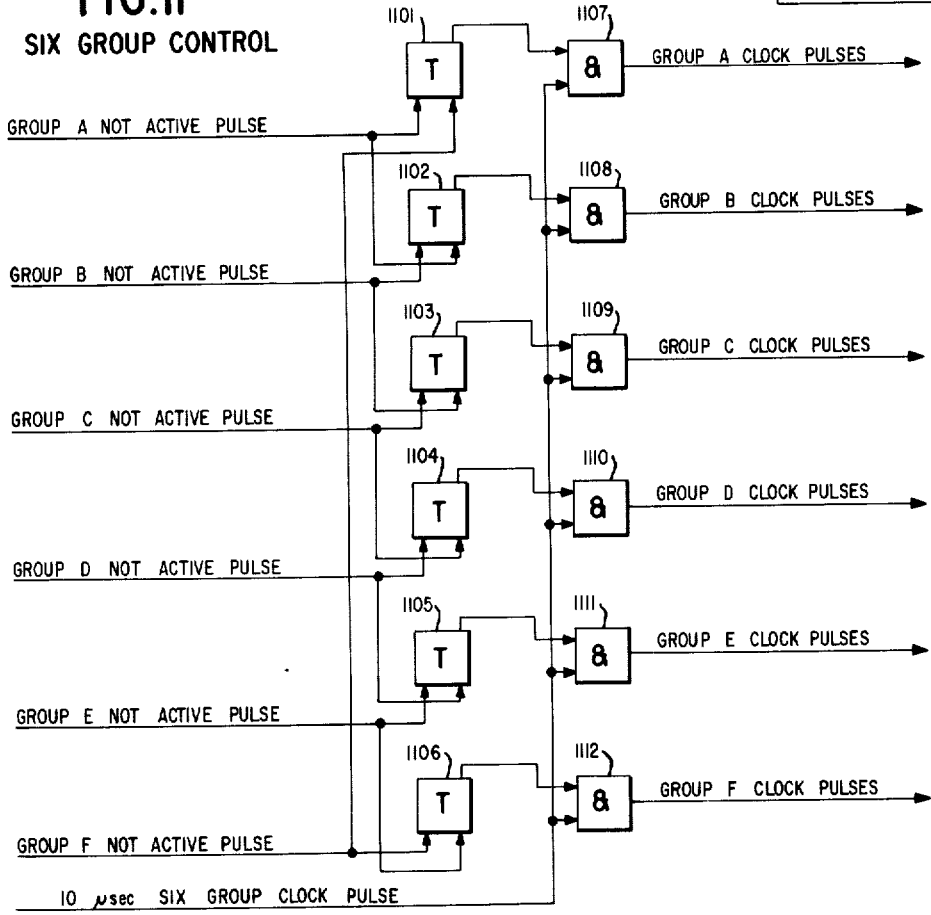

CHARACTER REGISTERS AND ASSOCIATED CIRCUITRY

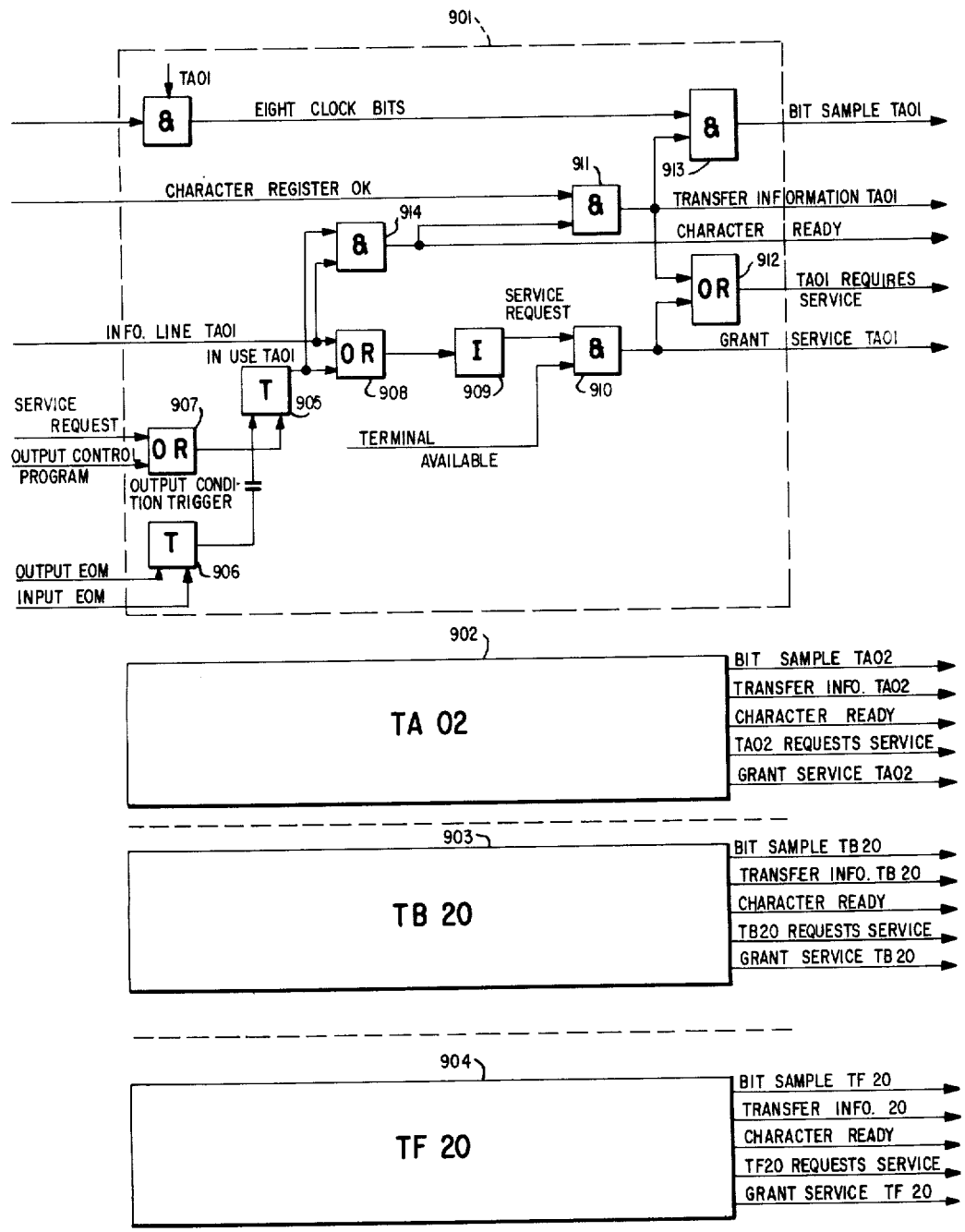
FIG. 9  CONTROL COMPUTER TERMINAL SAMPLING

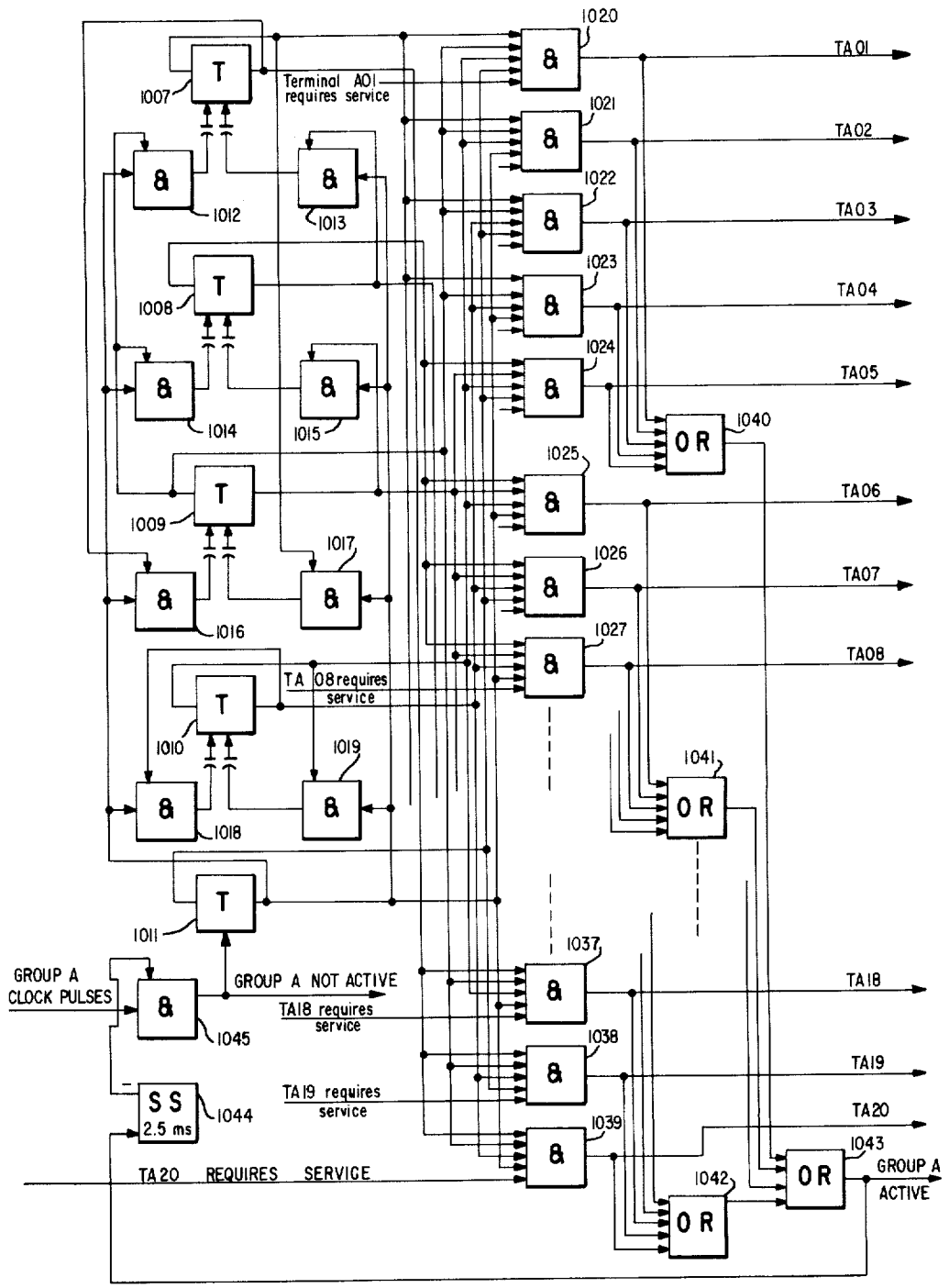
FIG.10A — TWENTY TERMINAL GROUP A CONTROL

RIGHT TO KNOW

BUFFER SAMPLE CONTROL

United States Patent Office 3,245,045
Patented Apr. 5, 1966

3,245,045
INTEGRATED DATA PROCESSING SYSTEM
Peter L. Randlev, Croton-on-Hudson, N.Y., assignor to International Business Machines Corporation, New York, N.Y., a corporation of New York
Filed Nov. 21, 1961, Ser. No. 153,880
9 Claims. (Cl. 340—172.5)

This invention relates to integrated data processing systems and more particularly to an integrated data processing system particularly suitable for use in providing complete data processing service to a manufacturing concern.

In such a system it is desirable that all of the records, such as, for example, payroll, production and inventory records, be stored and processed by a central computer. It is necessary that a number of remote terminals have access to the information stored in the computer and be able to insert new information into the computer and initiate transactions at the computer. In many cases these remote terminals are in close proximity to the control computer and can be directly connected to the central computer. However, many of the remote locations are widely separated geographically from the central computer and, in order to conserve communication lines, it is necessary to connect some of these remote terminals to a buffer and connect only the buffer to the central computer over a communication line.

When there are a great number of remote terminals there is a problem of providing service to all of the terminals in the shortest possible amount of time. The scanning and servicing of remote terminals is a particular problem when some of the terminals are connected directly to the computer and some of the terminals are connected through a buffer to the computer. In the case of the directly connected terminals it is desirable that the terminals be able to transmit a message directly to the computer without transmitting a terminal identification character. This requires that the terminals be scanned in a predetermined sequence so that the central computer is always informed of the directly connected terminal that is being serviced. In the case of the buffers, it is desirable that any buffer requiring service be granted priority because each of the buffers is servicing a number of terminals and another terminal serviced by that buffer may be held up if the buffer is not granted priority. For this reason, it is desirable to intersperse the scanning of the directly connected terminals with the scanning of the buffers. That is, after one directly connected terminal is scanned, it is desirable to scan all of the buffers to see if any require service and, if they do, then scan all the buffers. This interspersed scanning and the requirement that the control computer be able to tabulate exactly the directly connected terminal presently being serviced presents a difficult problem in such a data processing system.

Another problem in such data processing systems is that a particular remote terminal should not be allowed to have access to all of the information in the central computer. That is, remote terminals in the production department should be able to change and have access to only production information and should not, for exemple, be permitted to change or have access to payroll information. Thus, it is desirable to establish a "right-to-know" in regard to each remote terminal's access to certain information in the central computer.

These and other problems associated with such an integrated data processing system are solved by the present invention which is directed particularly to the interconnection of the central computer and the input-output devices at each of the remote terminals.

Accordingly, it is an object of the present invention to provide an improved integrated data processing system having a plurality of remote terminals connected directly to a central computer and a plurality of remote terminals connected through buffers to the central computer with provision to scan all of the remote terminals and service the terminals quickly and efficiently.

It is another object of the present invention to provide an improved integrated data processing system in which a plurality of remote terminals are scanned by a central computer at a high scanning rate until a plurality of the terminals requiring service have been scanned and are being serviced by the computer at which time the scan assumes a different, slower, rate.

It is a still further object of the present invention to provide an improved integrated data processing system having a plurality of remote terminals directly connected to the computer and a number of remote terminals connected through buffers to the computer and in which priority is given to request for service by one of the buffers so that the buffer interrogations are interspersed with interrogations of directly connected terminals while at the same time the central computer accurately tabulates whichever directly connected terminal is being interrogated so that it is not necessary for the directly connected terminal to transmit an identification character associated with any messages originating at that terminal.

It is a still further object of the present invention to provide an improved integrated data processing system in which a plurality of remote terminals have access and can change information at a central computer only on a "right-to-know" basis.

In accordance with one embodiment of the invention the data processing system includes a single transaction computer which performs the actual processing of the transactions and a control computer which transports information to and from the processing computer. Remote terminals are provided and are located within the plants according to various criteria. Different kinds of terminals are available in order that each particular department in which they are placed may perform its job more efficiently and economically.

Each terminal is connected to the computer or to one of the buffers by an information line and by a bit sample line. When the terminal requests service to transmit a message to the computer, bit sample pulses are supplied from the computer to the terminal to readout the bits of a character from the terminal onto the information line. When the character is received at the central computer it is immediately checked for validity and a response character is transmitted back to the remote terminal indicating that the transmitted character was valid or invalid. Each character transmitted in the system is followed by a response character, traveling in the opposite direction to indicate valid reception and to initiate transmission of the next message character.

Directly connected terminals are scanned in sequence and may only handle one message character per scan, per terminal. A two-speed scan is provided which interrogates each terminal for short intervals and spends more time with the terminal when it must be serviced than when it has no traffic. The buffers as a group are interrogated between each sampling of a directly connected terminal and, if any require service then all buffers are interrogated at this time. While entering complicated messages into the system, the operator is assisted by the machine system in a process in which the operator and machine system have an information interchange while a message is being entered, much as would occur between two humans performing the same task. This is referred to as a conversational mode of communication. Access to all information from the central processing unit is not provided for all terminals, since a transaction code plus terminal identification is utilized to insure access only a "right-to-know" basis.

The foregoing and other objects, features, and advantages of the invention will be apparent from the following more particular description of a preferred embodiment of the invention as illustrated in the accompanying drawings.

In the drawings:

FIGURE 1 is a block diagram of the over-all system;

FIGURE 4 shows the relation of the read and write heads to the various tracks on the magnetic drum buffer;

FIGURE 5 shows diagrammatically the precession scheme used in transferring information to and from the buffer;

FIGURE 7 is a diagrammatic showing of the order in which the buffered and directly connected terminals are interrogated;

FIGURE 9 shows the terminal sample controls at the central computer;

FIGURES 10A and 10B show the terminal group controls;

FIGURE 11 shows the six group controls;

Figure 2A:
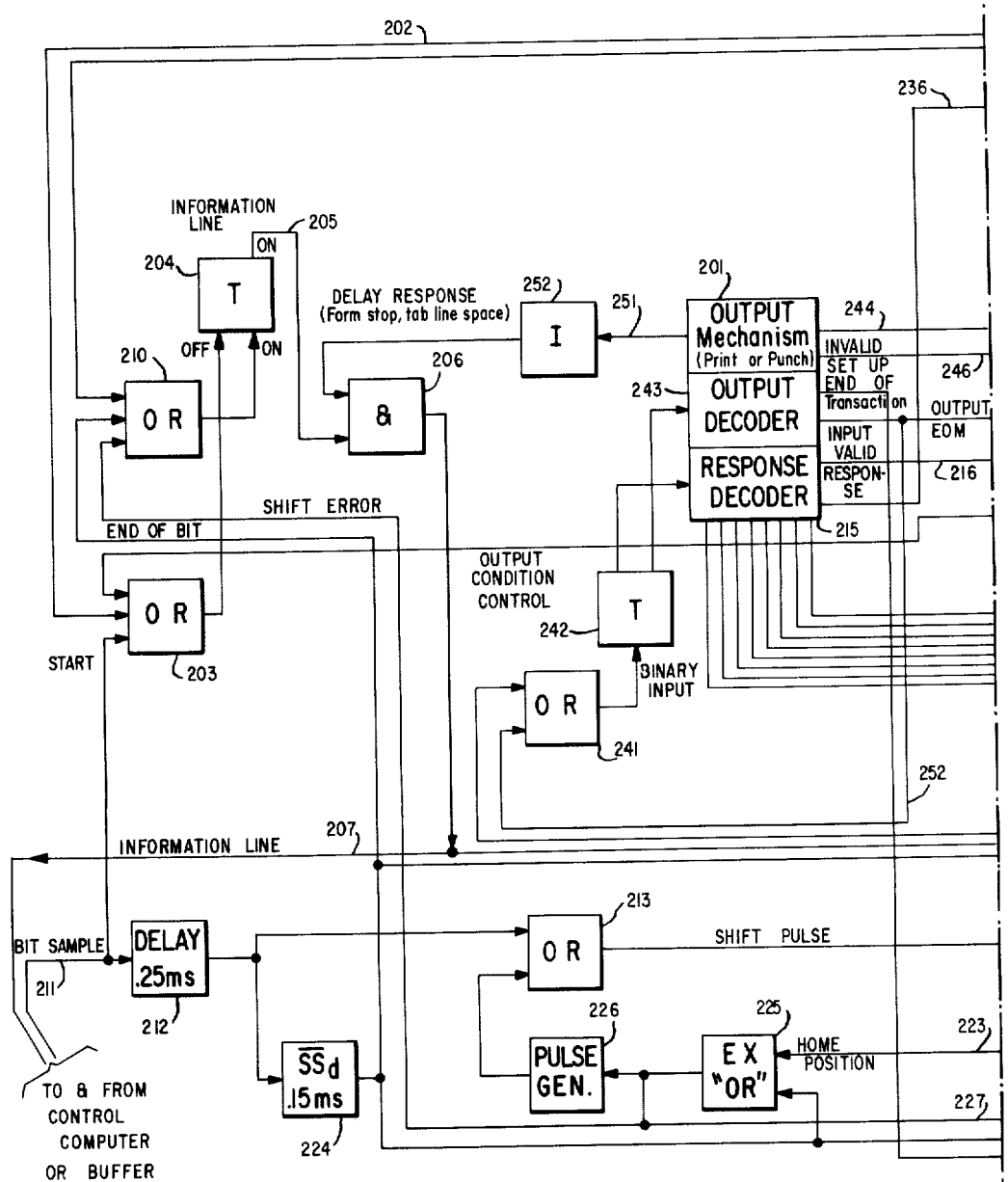
FIGURES 2A and 2B are logical diagrams of the remote terminal controls.

In the system transmission of messages is by 8-bit characters. The encoders and decoders shown in block form in the drawings are well known and many 8-bit encoders and decoders may be used for this purpose. The triggers shown in block form in the drawings are well known bistable devices which are turned off by an input to the left-hand input of the trigger and are turned on by an input to the right-hand input of the trigger. An input to the center of a trigger block signifies a binary input which switches the trigger to alternate binary conditions. Two outputs are provided on each trigger and the right-hand output of the trigger is referred to as being "up" when the trigger is on and the left-hand input is referred to as being "up" when the trigger is off. When the opposite conditions prevail, the respective lines are referred to as being "down" or approximately ground. Conventional AND and OR circuits are shown in block form in the drawings. When all inputs to an AND gate are "up" the output is referred to as being "up." When any one input to an OR gate is "up" the output is "up." Conventional exclusive OR gates are shown in the drawings and are such that when either, but not both, inputs are "up," the output is "up." In referring to the drawings, the first one or two digits of each reference numeral denote the figure number on which the reference numeral appears.

Over-all system, FIGURE 1

Referring to FIGURE 1, there is shown a block diagram of the over-all integrated data processing system. In this system a processing computer 1 is used to perform the actual processing of the transactions with all required information brought to and taken from the processing computer as required. A control computer 2 is provided to control the flow of information from the remote terminals to the processing computer.

Several remote terminals, each of which provides access to the central computer and provides information from the central computer, are diagrammatically shown in FIGURE 1. Some of these remote terminals are directly connected to the control computer. In the embodiment shown, these directly connected terminals are divided into six groups. A first group of directly connected terminals are designated A01, A02, A03 ... A20. A second group of directly connected terminals are designated B01, B02, B03 ... B20. The three groups C, D and E of directly connected terminals are not shown while the last group F01 ... F20 is shown. It will be understood that as many groups as are necessary may be provided and each group may have a varying number of directly connected terminals.

The directly connected terminals are generally provided in locations which are in close proximity to the control computer. In outlying locations where extensive communication facilities are required to connect the terminals to the central computers, provision is made to connect the terminals to a buffer and thence to the control computer in order to conserve communication facilities. Terminals 3, 4 and 5 are shown connected through buffer 6 to the control computer 2. Similarly, terminals 7, 8 and 9 are shown connected through the buffer 10 to the control computer 2. Numerous other terminals may be provided at outlying stations and are connected through a plurality of buffers as required. It will be understood that the number of terminals serviced by one buffer will vary as required, and the quantity of buffers can likewise be varied. A buffer is provided at each remote location and all of the terminals at that remote location are connected through the buffer to the control computer.

Each of the directly connected terminals is connected to the control computer by an information line and a bit sample line; the information line 11 and bit sample line 12 being shown connecting terminal A01 to control computer 2. Each buffer is connected to the control computer by an input line and an output line; the input line 13 and the output line 14 being shown connecting buffer 10 to control computer 2. Each buffered terminal is connected to the buffer by an information line and a bit sample line; the information line 15 and the bit sample line 16 being shown connecting terminal 7 to buffer 10. Information line 15 and bit sample line 16 are similar to their counterparts 11 and 12 from the directly connected terminals.

Terminal controls, FIGURE 2

Figure 2B:
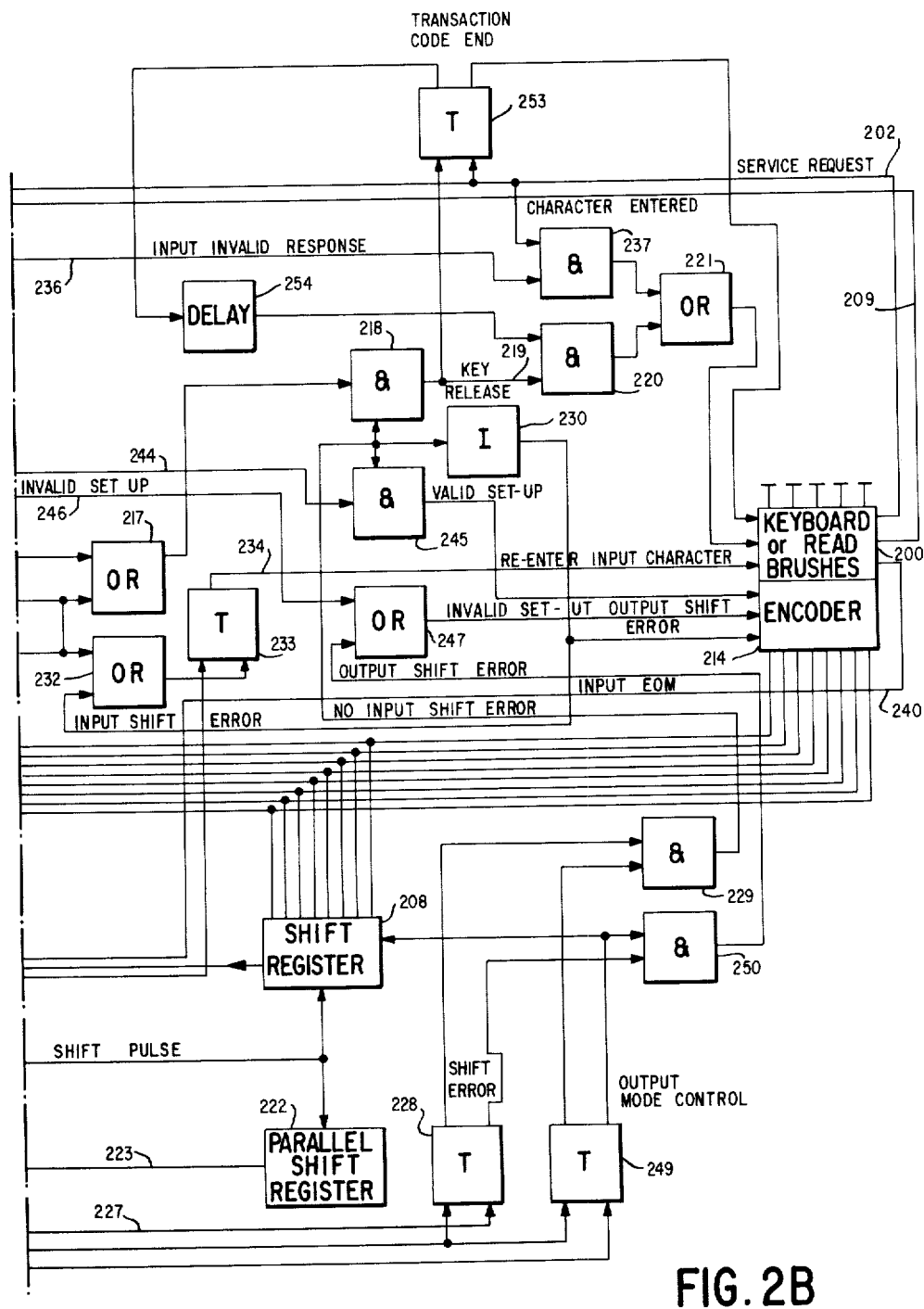

The logic circuitry for controlling the flow of information to and from the remote terminals is shown in FIGURES 2A and 2B. Each of the remote terminals, such as the terminals A01, A02, A03 or 3, 4 or 5 are provided with the controls shown in FIGURE 2. While the terminals controls will be described as being directly connected to the computer, the same controls are used at terminals connected through a buffer to the computer.

Each remote terminal is provided with a keyboard, or other input device 200 for entering information which is to be transmitted to the computer and an output mechanism 201 for registering information received from the computer. When the terminal is in a condition to transmit messages to the computer, the condition will be referred to as input and when the terminal is in a condition to receive messages from the computer the condition will be referred to as output.

Assume the use of a keyboard with this particular terminal. When the operator at the remote terminal wishes to transmit a message to the computer, he depresses the service request key on keyboard 200 which raises the SERVICE REQUEST line 202. All other keys will have been locked in their raised position. The SERVICE REQUEST line 202 acts through OR gate 203 to set the information line trigger 204 in the OFF condition. When the information line trigger 204 is set OFF, the line 205 goes down and, consequently, the output of AND gate 206 goes down. The output of AND gate 206 is connected to information line 207. When information line 207, which is connected directly to the central computer, is brought down to approximately ground level, the computer is signalled that one of the directly connected remote terminals requires service. As will subsequently be shown, in conjunction with the description of the central computer controls, the down condition of the information line together with the settings of certain control triggers, indicate a service request by the remote terminal.

The TRANSACTION CODE END trigger 253 is turned on by the SERVICE REQUEST 202 and turned off by the VALID RESPONSE to the TRANSACTION CODE. This is the first character following the SERVICE REQUEST through AND circuit 218 and OR circuit 217, which is gated by INPUT VALID RESPONSE line 216 from the RESPONSE DECODER 215. While trigger 253 is ON the keyboard is locked and remains locked for a short time after the TRANSACTION CODE END trigger 253 has been turned off. This allows the present signal on the INPUT VALID RESPONSE line 216 to fall.

Following a SERVICE REQUEST the keyboard 200 cannot be activated until the SERVICE ANSWER has been transmitted from the control computer or the buffer to the terminal to signify that the system is capable of handling this input message. The SERVICE ANSWER is an END OF MESSAGE character and is decoded at the output DECODER 243 to condition OR circuit 217, AND circuit 218, KEY RELEASE LINE 219, AND circuit 220, and OR circuit 221. The output of OR circuit 221 conditions the SERVICE REQUEST KEY to raise it to its normal position. The keyboard will now also be unlocked to allow the entry of the message.

After depressing the SERVICE REQUEST key, the operator depresses the key of the first character in the input message. Depression of this key acts through encoder 214 to set the code of the desired character into shift register 208. Shift register 208 may, for example, be composed of magnetic cores. Each key from the keyboard 200 would then be wired through the four cores representing the four bits of this particular character.

Depression of the appropriate character key causes the bits to be set up in the shift register and locks the keyboard. The key returning to its normal position will raise the line 209 which acts through OR gate 210 to turn the INFORMATION LINE trigger 204 on. Line 205 from INFORMATION LINE trigger 204 goes up and this acts through AND gate 206 to raise the information line. The raising of the information line indicates to the control computer that a character has been entered into the shift register and this character should be read out. Accordingly, the CENTRAL CONTROL computer transmits a series of eight bit sample pulses which are received at the terminal over line 211. The first of these bit sample pulses on line 211 acts through OR gate 203 to turn the INFORMATION LINE trigger 204 off and to bring the information line 207 down. The incoming bit sample pulses are delayed for .25 millisecond by the delay device 212. These pulses are connected through an OR gate 213 to the SHIFT register 208 and shift the bits of the stored character out of the SHIFT register 208 onto the information line 207. The character is then transmitted to the computer.

When the computer receives the input character, the character is immediately checked for validity. If the transmitted character was a valid one, the computer sends a character back to the remote terminal indicating the reception of a valid character and enabling the remote terminal to proceed to send the next character. The character from the computer indicating that a valid input has been received is set serially into SHIFT register 208 and then decoded by decoder 215. When decoder 215 detects the character indicating a valid input, the line INPUT VALID response 216 is raised and this line acts through OR gate 217 and AND gate 218 to produce the KEY RELEASE signal on line 219. The KEY RELEASE signal acts through AND gate 220 and OR gate 221 to unlock the keyboard and permit the entry of another input character. The keyboard is unlocked and upon depression of the next key the steps described above are repeated.

During the transmission of an input character, the shift pulses fed through OR gate 213 to SHIFT register 208 are monitored to insure that the shifting is accomplished properly. Shift pulses from OR gate 213 are also fed to a PARALLEL SHIFT register 222. When PARALLEL SHIFT register 222 has received the proper number of shift pulses to read a character out of SHIFT register 208, the SHIFT register 222 is set to the home position, thus raising the line 223. This condition should occur within a predetermined time interval and if it has not occurred in this time interval there has been a shift error. In order to detect this time interval, a SINGLE-SHOT multivibrator 224 is provided. This single-shot is set upon the occurrence of the first shift pulse from DELAY DEVICE 212 and is reset a predetermined time period thereafter. The output of single-shot 224 is gated against the HOME POSITION signal on line 223 in the EXCLUSIVE OR gate 225. An output of EXCLUSIVE OR gate 225 is indicative of a shifting error. The output of EXCLUSIVE OR gate 225 actuates PULSE generator 226 which produces auxiliary bit sample pulses which act through OR gate 213 to clear the SHIFT register 208 and to drive the PARALLEL SHIFT register 222 to the home position. The output of EXCLUSIVE OR gate 225 also acts over line 227 to turn on the SHIFT ERROR trigger 228. The output of EXCLUSIVE OR gate 225 also acts through OR gate 210 to turn the INFORMATION LINE trigger 204 on, thus bringing the information line 207 up.

The SHIFT ERROR trigger 228 is set ON by the output of EXCLUSIVE OR gate 225 and is set OFF by the END OF BIT pulse from the single-shot 224. When SHIFT ERROR trigger 228 is set ON, the output of AND gate 229 goes down and this signal, when inverted in inverter 230, inhibits the encoder 214. The output of inverter 230, denoted INPUT SHIFT ERROR, is also applied through OR gate 232 to set trigger 233 into the ON condition. When trigger 233 is in the ON condition, the line 234 is down. Line 234, denoted RE-ENTER INPUT CHARACTER, is up when trigger 233 is set into the OFF condition by the END OF BIT signal from the single-shot device 224.

When the remote terminal transmits an invalid character to the central computer, the circuitry at the computer recognizes the character as invalid and the response character transmitted to the remote terminal over information line 207 is indicative of the invalidity of the input character. The response character is set into shift register 208 and decoded in response decoder 215 which in turn raises line 236, INPUT INVALID RESPONSE. This signal acts through AND gate 237 if the service request line 202 is up, and OR gate 221 to release the keyboard to permit the character to be re-entered. The keyboard remains locked until a VALID RESPONSE is received. To prevent the keyboard from remaining locked indefinitely, in the case where a wrong character has been set up in the register, AND gate 237 is used to feed a signal to OR gate 221 if the SERVICE REQUEST LINE 202 goes up as a result of the operator depressing the SERVICE REQUEST KEY on the keyboard 200 while INPUT INVALID RESPONSE 236 is up.

When the operator has inserted the complete input message, he depresses a key which indicates an INPUT END OF MESSAGE. This key raises the line 240, input EOM, which acts through OR gate 241 to change the condition of the OUTPUT CONDITION CONTROL trigger 242. The outputs of OUTPUT CONDITION CONTROL trigger 242 are connected to OUTPUT decoder 243 and to RESPONSE decoder 215 so that RESPONSE decoder 215 is now de-conditioned and OUTPUT decoder 243 is conditioned to decode an output message. The terminal is now in condition to receive characters from the central computer. These characters are received on information line 207 and set into shift register 208 by the shift pulses. The characters set into shift register 208 are decoded by OUTPUT decoder 243 which in turn actuates the appropriate character of the OUTPUT mechanism 201 which may, for example, be a print hammer or a punch for that particular character. Each setup of the OUTPUT mechanism 201 is sensed to detect whether the output setup is valid or invalid. If the output setup is valid, the line 244 is raised and the output of AND gate 245 is raised to encode a valid setup character in the encoder 214. This valid setup character is set into shift register 208 and transmitted on information line 207 to indicate to the computer that the output character has been received and that another output character should be transmitted. If the OUTPUT mechanism 201 detects an invalid setup, the line 246, INVALID SETUP, is raised and this acts through OR gate 247 to enable encoder 214 to encode a character indicating that the output character should be retransmitted. The encoded character from encoder 214 is set into shift register 208 and transmitted over information line 207 to the computer to indicate that the last output character is to be retransmitted.

Means are provided to detect a shifting error on output similar to the means for detecting an input shift error and condition AND gate 245. OUTPUT MODE CONTROL trigger 249 is conditioned in accordance with whether the terminal is in the input or output mode. If a shift error, indicated by the setting of SHIFT ERROR trigger 228 occurs at the same time that the OUTPUT MODE CONTROL trigger 249 is set, AND gate 250 is energized and the output of this AND gate, OUTPUT SHIFT ERROR, acts through OR gate 247 to enable encoder 214 to encode a character indicating that the last output character has not been received properly and that it shoud be retransmitted.

OUTPUT mechanism 201 requires a slightly longer period of time to set up certain output characters. For example, FORM STOP, TAB AND LINE SPACE require slightly extended periods and the remote terminal can not accept another output character immediately after the reception of one of these characters. When one of these characters is being set up, the line 251 is raised, the output of inverter 252 goes down, and the output of AND gate 206 goes down, thus bringing information line 207 down. When information line 207 goes down, the central computer is signaled to delay the next output character until the action is complete and the information line 207 has gone back up.

When the message from the computer to the terminal is completed, the computer transmits an output end of message character. This output end of message character is decoded by the OUTPUT decoder 243 and the line 252 is raised. This line, acting through OR gate 241, changes the condition of the OUTPUT CONDITION CONTROL trigger 242. The output EOM signal also acts through OR gate 217, AND gate 218, AND gate 220 and OR gate 221 to release the keyboard 200 and permit another input message to be entered. The output of AND gate 218 sets the TRANSACTION CODE END trigger 253 in the OFF condition and OFF output of this trigger acts through delay 254 to enable AND gate 220, thus providing a key release for the keyboard as previously mentioned, except on an end of transaction. When an END OF TRANSACTION key on keyboard 200 is depressed by the operator, the entire keyboard 200 except the SERVICE REQUEST key, is locked against an operator entering any additional information. The terminal controls are then left in an output condition. Line 207 fed by AND gate 206 is brought up. The INFORMATION LINE up with the TERMINAL in an OUTPUT CONDITION and the IN USE trigger off signifies that the terminal is awaiting a new transaction.

Figure 3:
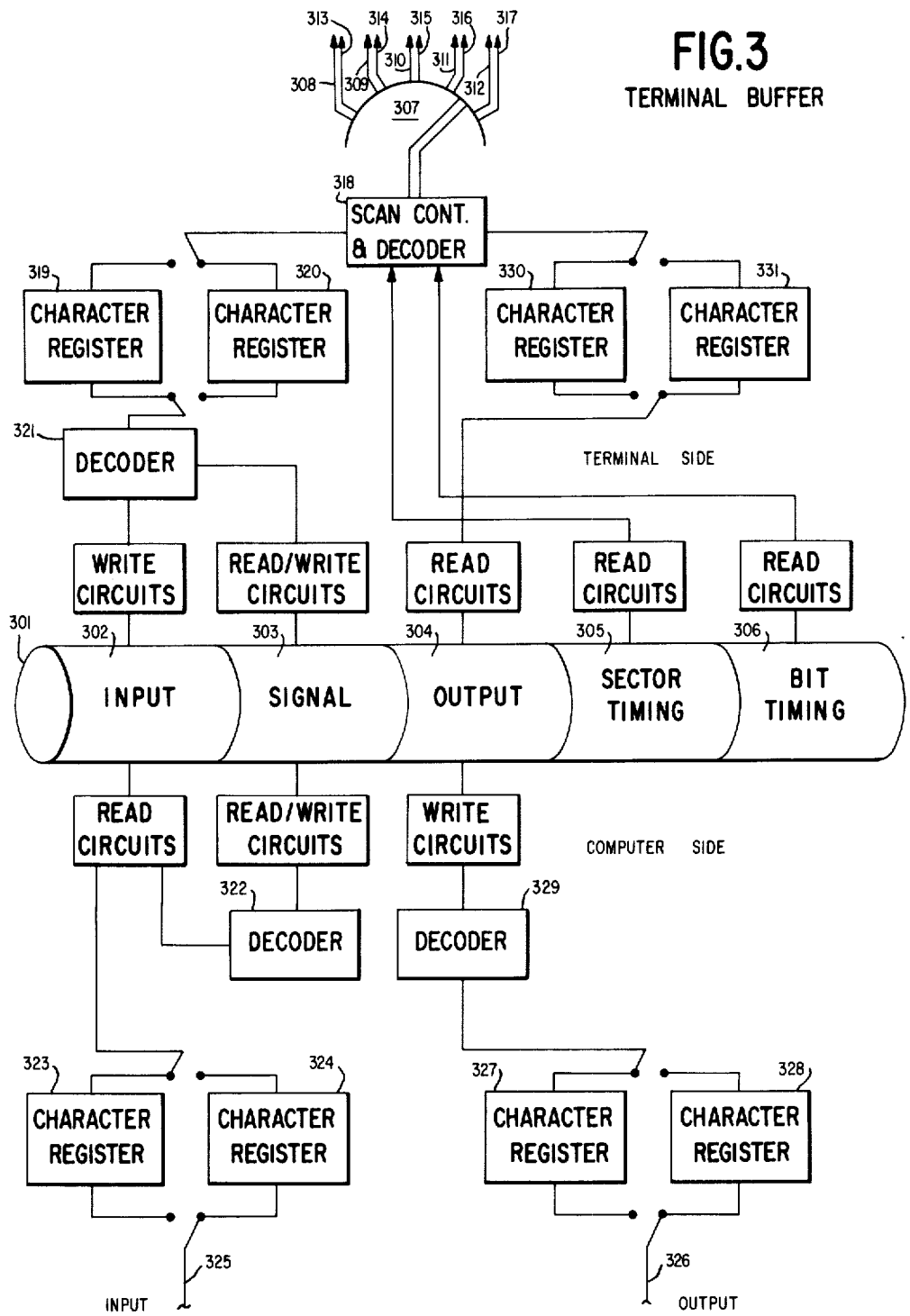
FIGURE 3 is a block diagram of the buffer used in the system.

Terminal buffer, FIGURE 3

The controls described above were described in conjunction with the terminals which are directly connected to the central computer. The controls described above can also be used for the terminals which are connected to the computer through a buffer. The buffer and associated circuitry, shown in FIGURE 3, will now be described.

In the embodiment shown, the buffer is a magnetic drum 301. The magnetic drum 301 is divided into five sections. The section 302 is provided to process input messages transmitted from the terminals to the computer. The signal section 303 is provided to actuate the switching for positioning of successive characters and indicates the input and output modes of the terminals. An output section 304 is provided to process output messages transmitted from the computer to the remote terminals. The sector timing section 305 indicates the relative location of the drum in its total cycle and makes possible resynchronization if the buffer or terminals fall out of step with the rest of the system. The bit timing section 306 is provided to generate bit sample pulses to read information into and out of the input shift register at each terminal.

On the terminal side of the buffer there is shown diagrammatically a scanning switch 307 for selectively scanning all of the remote terminals connected to the buffer. The scanning switch selectively and successively connects a plurality of pairs of transmission lines to the buffer. In the embodiment shown, five pairs of lines, corresponding to five terminals being serviced by that buffer, are provided. Of these pairs, the lines 308, 309, 310, 311 and 312 are information lines and are connected, for example, to the information line 207 shown in FIGURE 2. The other lines, 313, 314, 315, 316 and 317 are bit sample lines and are connected, for example, to the bit sample line 211 in FIGURE 2. As the scanning switch 307 moves from position-to-position, one of the information lines, for example, 312, is connected to either the input section 302 or the output section 304 of the buffer depending upon whether the terminal is in the input or output mode. Also, one of the bit sample lines, for example, 317, is connected to the bit timing section 306 of the drum in order to provide bit sample pulses to the remote terminal.

Each of the remote terminals connected to the buffer is provided with twenty-character sectors in the input 302 and output 304 sections of the drum. A twenty-first, or dummy sector, is also provided to allow the processing scheme to be described later. The remote terminals are connected to the buffer through a scan control and decoder 318 which is operated under control of the sector timing section of the drum 305. This insures that the terminal is connected to the appropriate sector of the input or output sections of the drum.

On input, the remote terminal is connected to one of the two CHARACTER registers 319 and 320. Successive characters are read into alternate ones of the CHARACTER registers 319 and 320. The provision of these two CHARACTER registers allows the reading out of one CHARACTER register while the next character is being inserted into the other CHARACTER register.

On input, the characters of a message are stored in one of two subsectors of the sector assigned to that terminal. The characters are gated from the CHARACTER registers 319 or 320 to the apppropriate subsector by the decoder 321 which is operated under control of signals from the signal section 303 of the drum. The message characters are transmitted to the computer by reading the characters from the input section 302 under control of decoder 322 which again is controlled by signals from the signal section 303 to insure that the proper subsector of the drum is read out. The characters are transferred to one of two CHARACTER registers 323 or 324 and thence over line 325 to the computer. Transmission between the buffer and the computer is independent of the exact time that transmission is taking place between the buffer and the terminal.

On output, message characters are transferred over line 326 from the computer to one of two CHARACTER registers 327 or 328. As before, two CHARACTER registers are provided so that one register can be read while the next character is being set into the other register. The characters are transferred through decoder 329 to the sector of the output section 304 which is assigned to the terminal to which the message is addressed. At the appropriate time the message is read out of output section 304 to one of two CHARACTER registers 330 or 331 and then transferred through scan control and decoder 318, through the scanning switch 307 and over one of the information lines 308–312 to the addressed terminal.

The organization and operational details of the buffer may be better understood with reference to FIGURE 4 which shows a section of one terminal buffer drum track. This diagram gives an indication of the relative position of the heads with respect to the sectors on each of the five tracks. Assume the heads to be stationary and the scale under them representing the various tracks as moving to the left. There is shown in FIGURE 4 a read head 401 for the bit timing track 306, a read head 402 for the sector timing track 305, a write head 403 for the output track 304, a write head 404 for the signal track 303, a read head 405 for the signal track 303 and a read head 406 for the input track 302. The heads on the terminal side of the buffer are shown in FIGURE 4. It will be apreciated that identical heads will be provided for three of the five tracks on the computer side of the drum.

The timing bit rate track 407 provides pulses for each of the 160 bit positions in each sector. There is an interval of 0.10710 degree between the center of each of these bits on the surface of the drum. These, as well as the timing sector rate, are permanently recorded.

The timing sector track 408 is required for proper positioning identification in case the drum is ever out of step with either a terminal or the control computer. All the information that is required here is provided by signals of three different durations. A constant signal is provided for approximately the last quarter of each sector with the execution of the dummy sector No. 21. The fall of the signal indicates the beginning of a new sector. During the last quarter of the first subsector of each sector there is another constant signal to indicate the start of the second subsector. The entire first subsector of the dummy sector has a constant signal to provide the indication of the beginning of the series of sectors Two single-shot circuits are used to recognize the various durations of these three signals. Characters may be transmitted only if the buffer is in proper synchronization.

An output track 409 and an input track 410 are provided for output and input messages, respectively. These tracks will normally be reset to a character configuration representing a blank character. Read and write heads are associated with the proper side of the drum. The heads are a specific distance from each other and have a constant relation with the heads on the timing tracks.

The remaining track, the signal track 411, requires four heads positioned so that the track's read head is able to read the entire sector before the heads for the input and output tracks have reached the same sector. In order that there be time to set the switches and because every fifth sector is serviced each revolution, the read head on the terminal side precedes the write head by six sectors. The head position on the computer side is not critical as eleven revolutions are devoted to each sector serviced. The write head must be positioned so that it will not start writing until the sector on the information track has been completely passed. Again, spacing between the heads on this track must be accurate with respect to each other and there must be a constant relation with respect to the heads on the other tracks. The portion of the signal track associated with each terminal will first indicate the fullness condition of each subsector. The portion is indicated as empty until it has been filled and as filled until it has been completely emptied. The characters are stored in the proper subsector as well as in the proper position within the subsector. It is not sufficient to choose the first open position as this might be the first position of the first subsector when the second subsector is the one currently being filled. This occurs when characters have just been sent to the control computer from the first subsector and it is indicated as empty while the second subsector is being filled. In order to insure both the proper subsector as well as the proper position within the subsector, a character count is stored on the signal track. Positioning information of this type is required for both the terminal and the computer sides of the buffer. This information must be available before the terminal's input and output sectors have reached their respective heads.

The character counts on the signal track are immediately followed by the terminal's identification character. This is a single character that is transmitted to or from the control computer preceding each group of ten characters to be transmitted. The signal track requires a read head on the terminal side of the drum that is ahead of the read head of the output track and write head of the input track. A write head is positioned so that the entire sector will have passed the heads on both the input and output tracks before the same terminal's sector reaches the write head on the signal track. The same configuration is duplicated on the computer side of the buffer.

All transmission between the buffer and the central computer will be in groups of ten characters each. Thus, it is possible to detect at either end of the transmission line if any characters have been added or deleted in error during transmission. To implement this scheme, means are provided to transmit blank characters whenever the end of the message will not complete a ten-character group. To accomplish this, each character position on the information tracks is reset to a blank character after the character that had occupied this position has been successfully transmitted.

Each revolution of the drum, which in the embodiment shown, occupies 10.5 milleseconds, allows a single character to be transferred to or from the central computer. However, each of the twenty terminals must be serviced at a rate of approximately twenty characters per second. Thus, a precessing scheme is used. With the sectors located sequentially around the drum, the terminals 1, 6, 11 and 16 and the dummy position are sampled during the first revolution of the drum. The second revolution services terminals 5, 10, 15 and 20. This precessing scheme may be followed on FIGURE 5. It should be noted that the next sector to be serviced may be found by adding 5 modulo 21 to the sector presently being serviced.

Operation of buffer

Figure 6:
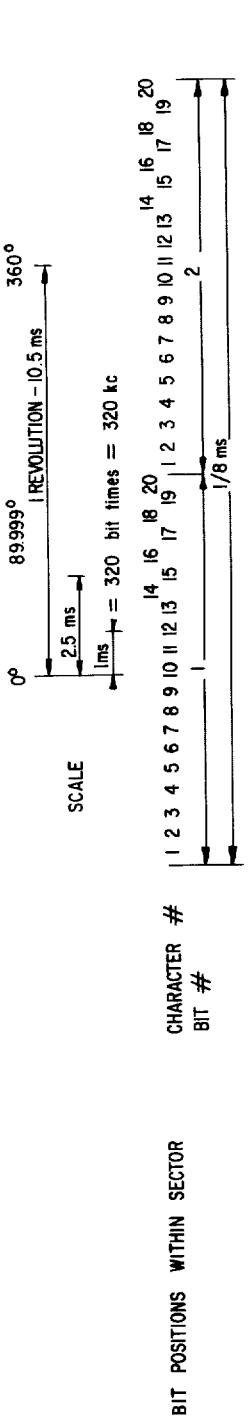
FIGURE 6 is a timing diagram depicting the operation of the buffer.

The exact timing relationships for the operation of the buffer can best be seen in FIGURE 6. The terminal operations previously described in conjunction with the unbuffered terminal, FIGURE 2, will apply here.

When the operator has requested service, the service request key on the terminal remains latched down and the information lines 308, 309, 310, 311 or 312 to the buffer will fall. If the terminal's sector on the signal track indicates that the terminal is not in use, the buffer's circuitry will cause a service request and an end of message character to be written on the input track 302. The bit positions for writing these characters and all other operations are controlled by the bit timing track 306. Writing the end of message character causes the indication on the signal track to show that this subsector is full and that the terminal is in use with an input message. The remaining eight positions in the subsector contain blanks.

The computer side of the buffer will now act as it does for any input message. As soon as this sector's turn to be serviced occurs, the computer interrogates the signal track. As soon as the buffer has completed the transmission for an entire subsector, the buffer interrogates each of the successive sectors to find the next sector requiring service as designated by the full subsector indication. The buffer will first transmit the terminal's identification character, followed by all ten characters on this subsector, even though in this case the only message character is a service request. The buffer is now prepared to service another terminal's sector while the control computer is determining if it can service the first terminal.

When the control computer is ready to send the service answer, it signals the buffer to pick up the message composed of the terminal identification, service answer, end of message, and eight blank characters.

This message is placed on the output track 304 in the sector designated by the identification code and an indication will be made that the subsector is full.

The service answer may now be sent from the buffer to the terminal. As four terminals are serviced each revolution, the initiation of this transmission, at the most, will take five revolutions. As in the unbuffered case, the validity will be checked on a character-by-character basis with the terminal returning the response for the previous character just preceding the reception of the new character. As this is the first character in the group of ten, the response preceding it will automatically indicate valid.

The signal track is used to indicate from which position in the subsector the character will be removed or added. This indication will always be for the last character transmitted and a valid response will cause the next character to be removed from or added to one position higher. Thus, if the character becomes invalid during output transmission, the original character will be retransmitted.

The end of a message character is transmitted in a similar manner. The buffer will, however, not transmit the blank characters following the end of message to the terminal. The signal track will be automatically changed to indicate the terminal as now being in an input mode with the subsector empty and ready to receive the next message.

The transaction code and an end of message character will now be entered at the terminal. As the terminal is now indicated as being in use, the information line will be brought up to indicate that a character is ready to be transmitted. The information line must go down as soon as it has received a valid response. The signal track will indicate that the first character shall be written in the first position of the first subsector. The characters will be transmitted serially from the terminal and entered serially onto the input track 302.

The validity of each character will be checked immediately by the buffer and the response returned to the terminal. If the response is valid, the character position counter on the signal track will be increased by one and the terminal will allow the next character to be entered. The end of message character will, however, keep the terminal locked out against any additional characters being entered at this time.

The end of message character at the buffer will cause the subsector to be indicated as full so that the computer side of the buffer may now transmit the transaction code to the control computer in the same manner as it previously transmitted the service request. When the control computer has determined that it may accept the transaction it will return the service answer as previously described following the service request.

On input to the computer, the service answer will be returned to the terminal to unlock the keyboard and to allow the input message to be entered. The procedure here will be the same as for entering the transaction code except that now, presumably, the message will be longer than a single character group. As soon as all ten character positions have been correctly filled, the signal track will indicate that the first subsector is full and immediately allow the next character to be entered in the second subsector. The ten characters will be transmitted to the control computer as soon as possible so that the first subsector will be available for the succeeding group. The only time when there can be a delay is if the buffer is overloaded and cannot transmit to the control computer as rapidly as the terminals are providing it with information.

If the terminal is not prepared with a character when it is sampled, no information can be removed, but the full 2.5 milliseconds assigned to this terminal will not be able to be used for anything else. Characters will be entered and transmitted until the end of message character is received. Then, as before, the keyboard will remain locked until the control computer sends instructions to unlock it.

Output messages from the computer to a remote terminal can be initiated by a processing program or follow an input message from the same terminal. In either case, the central computer must find that the buffer is free and that the terminal is in an output condition. The terminal could only be in an input condition if this output message were initiated by the processing program just as a service request was being entered at the terminal.

For each ten character groups the terminal identification will be transmitted first in order to set up switching at the buffer to allow the characters to be stored on the output track in the proper sector. The validity of each character will be checked as received and if any character is invalid it and the remaining ones from the group of ten will not be stored and the invalid response will be returned to the central computer to request retransmission of the entire group.

As soon as all characters have been validly received, the signal track 303 indicates the subsector as being full and the next time the terminal side of the buffer services this sector the first character will be removed. These characters will be transmitted to the terminal as previously described for the service answer.

An end of message character will act as previously described and ultimately allow the terminal to enter additional characters. An end of transaction, however, will be transmitted in the same manner but will keep the keyboard locked. The end of transaction will always be initiated by the processing program.

If the terminals actually transmitted a character every 2.5 milliseconds, the computer side of the buffer would only be able to handle four terminals. The input rate to the buffers will never be this high. The buffer will always choose the next sector requiring service and will continue with it until either subsector is full and ready to transmit. The central computer and buffer will both be required to send the terminal identification preceding each group of ten characters and receive the validity response following the last of the ten. A character count will always be made in computer transmission with the buffer to insure that exactly ten characters (including any blank characters required) and thus only the intended messages, are transmitted in each group.

If the traffic through the buffer develops a heavy peak, the use of two subsectors for each sector will act as a smoothing device for the terminal. The subsectors must be emptied in the proper sequence as indicated by the character counter on the signal track. If this indication were not available, reading and writing would always start with the first available subsector of the two subsectors. However, this could cause portions of the message to be out of sequence if, and only if, the following two conditions exist: first, if the second subsector is only partially filled while the first subsector is being emptied and secondly, if the buffer becomes excessively busy so that the filling of the second subsector is completed and then the first subsector again is filled before the computer side of the buffer is able to read from this terminal's sector.

While the buffer as described cannot handle the maximum possible traffic for all its terminals, it is considered that it will be much more than adequate for its anticipated loads.

*Terminal interrogation equipment, FIGURE 7*

The terminal interrogation equipment is that portion of the terminal control system located in the control computer 2 that determines which terminals require service and identifies to which or from which the messages must flow.

Each of the 120 unbuffered terminals must be interrogated in sequence, and, if the interrogation shows that the terminal requires service, it must be serviced. A second bit sequence for servicing the four buffers must be interspersed with this first sequence. The system will allow 2.5 milliseconds for the transmission of each character with a terminal and each terminal must be interrogated approximately every 50 milliseconds. These conditions require a two speed scan to be used. That is, a busy terminal will be allowed its full 2.5 milliseconds while a terminal that is not in use should require only a single machine cycle which is assumed to be 10 microseconds. This interspersed, two-speed scan may be more readily understood by reference to the diagram of FIGURE 7. Starting at the top of this diagram, all four of the buffers are scanned to determine if any of the buffers require service. If any of the buffers require service, then all four buffers are interrogated after which the next terminal is scanned to determine if it requires service. If none of the buffers requires service the next terminal is scanned immediately. If the next terminal does require service, a 2.5 millisecond terminal interrogation cycle is provided after which the scanner steps to the next terminal at the end of 10 microseconds. If the next terminal does not require service the scanner steps to the next terminal at the end of 10 microseconds. Before scanning the next terminal, all four of the buffers are again scanned to determine if any of the buffers require service. The logic circuitry required to implement this scanning will be described subsequently. The operation of the control computer in scanning the unbuffered terminals and the operation of the computer in scanning the buffered terminals will be described separately before describing the interspersed scanning of buffered and unbuffered terminals.

Figure 8:
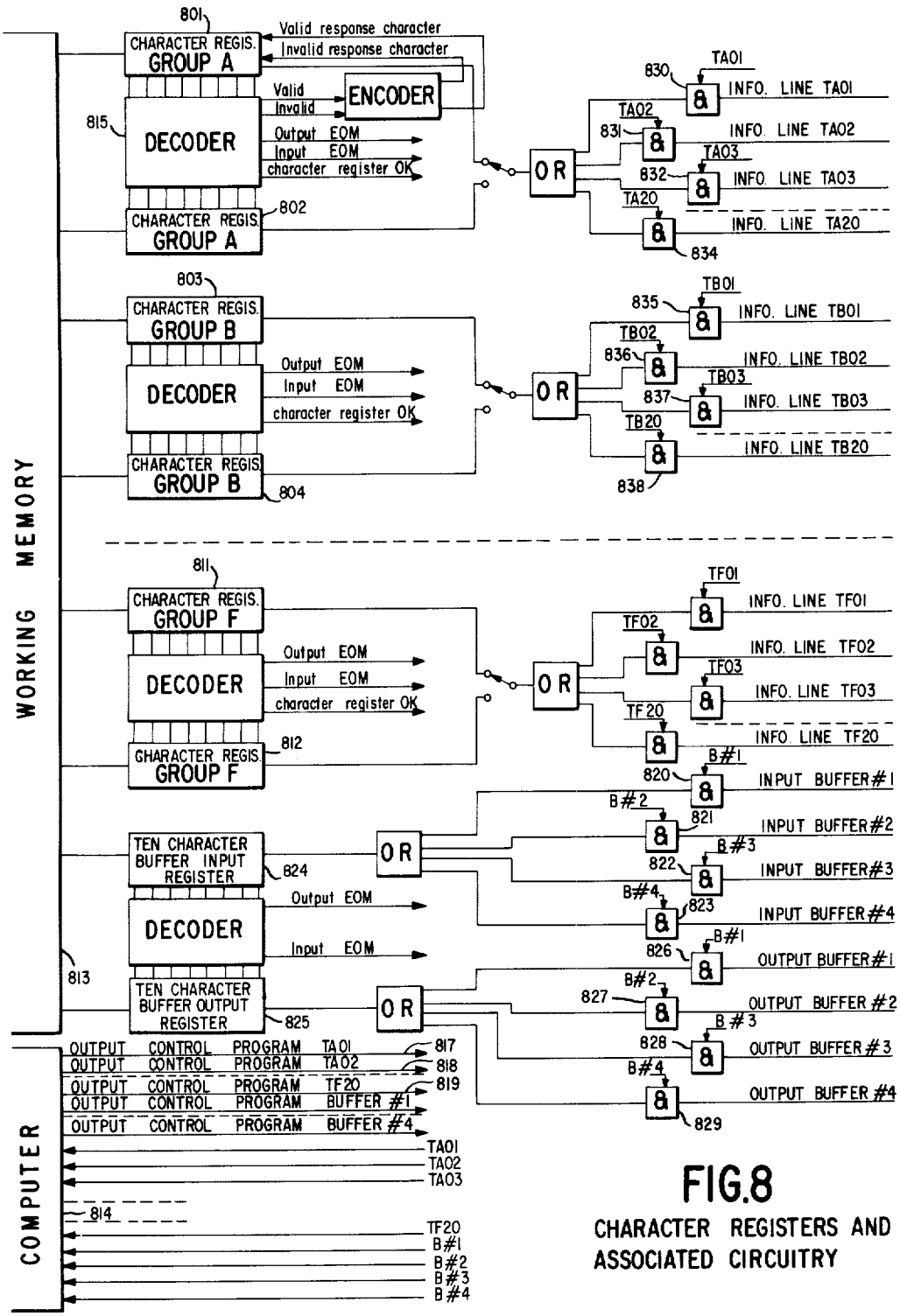
FIGURE 8 shows the character registers and associated circuitry which receive characters which are to be transmitted between the central computer and the remote terminals.

*Control computer, working memory, character register and associated circuitry, FIGURE 8*

The directly connected terminals have been divided into six groups of twenty terminals each as shown in FIGURE 1. Each group of directly connected terminals has two single character registers associated therewith. As shown in FIGURE 8, CHARACTER registers 801 and 802 are associated with Group A, CHARACTER registers 803 and 804 are associated with group B and CHARACTER registers 811 and 812 are associated with group F, the CHARACTER registers associated with groups C, D and E not being shown in FIGURE 8. These single CHARACTER registers provide temporary storage for messages being transferred between the working memory 813 of the control computer and the information lines to the directly connected terminals.

Each group of directly connected terminals is sampled sequentially and within each group each terminal is also sequentially sampled. Thus, each terminal is selected in order. The sampling sequence is: A01, B01, C01, D01, E01, F01, A02, B02, C02 . . . D20, E20, F20, A01, B01. . . . Because the terminals are always interrogated in accordance with this pattern, it is not necessary to transmit any terminal identification as the computer always knows which terminal is being interrogated.

Associated with each pair of character registers is a decoder. For example, decoder 815 is associated with CHARACTER registers 801 and 802 and provides indications when an output EOM, or an input EOM is received. The decoder also provides an indication, CHARACTER REGISTER OK, when a CHARACTER register is available for use by one of the terminals. Also associated with each group of terminals is a TERMINAL AVAILABLE trigger which indicates whether another terminal may be serviced when it requests service. For example, the TERMINAL AVAILABLE TRIGGER 816 is provided for the A group of terminals. Also shown in FIGURE 8 is the computer 814 which provides numerous signals to the terminal system. As an example, the lines 817, 818 and 819 are shown. These lines are up when the computer program has initiated an output message for terminals A01, A02 or F20 respectively. The remaining output control program lines are not shown.

The direction center for all operations involving the terminal system will be a Terminal Table. It consists of two major portions; the triggers and information lines which will be subsequently described and a magnetic core memory which is part of working memory 813. The portion of the terminal table in working memory can best be thought of as a matrix with each row representing one of the terminals. The columns of the matrix represent the transaction code, usage number, address, availability, priority, location, and time.

A transaction code is the unique identification assigned to each of the individual processing programs. They are used to obtain the proper processing program from program storage.

As the transaction code from a terminal is only a single character, it cannot alone provide sufficient identification to find the proper processing program. The control program will have to take both this single character transaction code and the terminal identification number to provide complete identification for the table look-up procedure. This will have the added advantage of aiding any so called "right-to-know" procedures as the use of any particular transaction program will be restricted to a very definite group of terminals. That is, a clerk at the shipping dock will have absolutely no access to the programs and information concerning the cashier's office. This can also be used by the control programs as an aid in detecting an obviously incorrect transaction code.

A control program will be required to reset the transaction code column for a terminal to a "no character" character. This will be used by another control program to signify that a terminal has been granted service but as yet has not entered the transaction code.

The usage numbers provide identification for each of the processing programs in the computer at any one time. For example, if there are several SALES ORDER ENTRY PROGRAMS being processed at one time the usage numbers would be the only possible means of differentiating one from another. Usage numbers are of the greatest importance while checking on the availability of a terminal for an output message. They can be any closed sequence of numbers and have here been assumed to be from one to one thousand.

The ADDRESS COLUMN of the TERMINAL TABLE will contain the address in working memory of the location where the next input character is to be placed or the location from where the previous output character was obtained. The difference at the control computer occurs as a result of the difference in time in receiving response characters. The input character's validity is checked immediately upon the receipt of the character and thus the memory location can also be immediately updated. On the other hand, the response character for output messages is not ready at the terminal until the next character is about to be sent from the control computer. If a valid output response is received at the control computer at this time, the address in the TERMINAL TABLE will be changed to indicate the next character. In either case, if the character transmitted was received in an invalid form, the address will remain the same and either the repeated input character will be stored in place of the invalid one or the transmission of the output character will be repeated.

Between transactions, the ADDRESS COLUMN in the TERMINAL TABLE is reset to the constant location of the fixed character that represents the service answer (EOM). It should be recalled that the first character to be transmitted following a service request must always be this service answer. It is then necessary for the address to be changed to that of the TRANSACTION CODE COLUMN for this particular terminal so that the transaction code may be stored. This will be accomplished by one of the control programs.

The PRIORITY COLUMN serves several functions in the control computer. First, its contents will be used to indicate a relative priority for determining the latest time by which an OUTPUT message must be transmitted. This is accomplished in either of two ways. If an output message for a transaction originated by the operator is to be transmitted, the priority will be the sum of a constant stored with the transaction program and the time at which the input message was entered. If an output message for a transaction originated by the control computer is to be transmitted, the priority will be a constant stored with the transaction program representing the time each day by which this transaction must be accomplished. An example of this would be any transaction that must be accomplished ANY time between the end of one work day and the start of the next.

The second function of the quantity in the priority column is, to provide a safeguard so that no INPUT message, once initiated, is left uncompleted. Again the priority will be the sum of a constant stored with the transaction program and, in this case, the time at which the transaction code is entered into the control computer. This entry of the priority in the TERMINAL TABLE will be accomplished by the same control program that identifies the transaction code.

Another control program will periodically inspect the PRIORITY COLUMN to determine if any of the messages have been delayed excessively. Output messages will be transmitted as soon thereafter as possible and a message will be sent to the supervisory station so that human action may be initiated to discover the cause of the delay in the completion of the entering of the input message.

The LOCATION columns contain the beginning address of a PROGRAM LOCATION TABLE and the end address expected for an input message. This is used to insure that an input message is not longer than the room set aside for it. If it were longer, it could write over and destroy any record that has been written in working memory beyond it.

The AVAILABILITY column is used to signify that a required terminal is currently busy. This will normally be of consequence only when the computer wishes to initiate an output message while a terminal is transmitting a different input message or involved with another transaction.

The TERMINAL IDENTIFICATION NUMBER COLUMN is used to provide terminal identification of messages stored in working memory and with messages sent to the buffers.

*Control computer terminal sampling logic circuitry, FIGURE 9*

Referring to FIGURE 9, there is shown the logic circuitry at the control computer associated with each terminal. The circuitry within the block 901 is associated with the terminal A01. Only the logical circuitry associated with TA01 is shown in detail. It will be understood that the logical circuitry 902 associated with TA02, the logical circuitry 903 associated with TB20 and the logical circuitry 904 associated with TF20 are all identical. One hundred and twenty identical logical circuits are provided and are associated wtih each of the one hundred and twenty unbuffered terminals in the system. Referring to the details of the logical circuitry 901, an IN USE trigger 905 indicates whether terminal A01 is currently being used to transmit an input or an output message. An OUTPUT CONDITION trigger 906 indicates whether the terminal is currently in an input or output condition. When trigger 906 is on it designates an output condition and when it is off it indicates an input condition. OUTPUT CONDITION trigger 906 is turned on by the input EOM from decoder 815 and is turned off by the output EOM from the decoder 815. The normal or reset condition of OUTPUT CONDITION trigger 906 is on. This indicates that the terminal is in an output mode whereas the off condition indicates an input mode. The IN USE trigger 905 will initially be turned on either by a service request or, in the case of the computer initiated transaction, by the output control program. Both the SERVICE REQUEST signal and the OUTPUT CONTROL PROGRAM TA01, line 817, are connected to OR circuit 907 and then to the on input of trigger 905. The IN USE trigger 905 is turned off by the rise of the OUTPUT CONDITION trigger 906 which is turned on at the end of each input message.

The OUTPUT CONDITION trigger, the IN USE trigger and the information line together indicate all possible conditions of the terminals. These conditions are shown in the following table in which 1's represent the on condition of the triggers and the up condition of the information line:

| Output condition trigger | In use trigger | Information line | |
|---|---|---|---|
| 1 | 1 | 1 | Output to be sent to terminal. |
| 0 | 1 | 1 | Input to be taken from terminal. |
| 1 | 0 | 1 | Skip—terminal not in use. |
| 0 | 0 | 1 | Skip—an output message will follow but is not as yet ready. |
| 1 | 1 | 0 | Skip—output response not ready. |
| 0 | 1 | 0 | Skip—input not ready in shift register. |
| 1 | 0 | 0 | Service request. |
| 0 | 0 | 0 | Won't exist. |

It may be seen from the above table that whenever the IN USE trigger is on, and the information line is up (first 2 rows), a character register will be required for the terminal. If on the other hand, these two are both down while the OUTPUT CONDITION trigger is on (seventh row) the terminal is requesting service. Thus, whenever the IN USE trigger and the information line are both in the same condition, the terminal must be serviced. The IN USE trigger 905 is turned on by OR circuit 907 if either a SERVICE REQUEST is received from the terminal or if the computer starts to send an output message to the terminal. Trigger 905 is turned off by either an input or output END OF MESSAGE as signified by OUTPUT CONDITION trigger 906 changing state. If the IN USE trigger 905 is on and the INFORMATION LINE is up, AND circuit 914 will be conditioned to signify that a character should now be transmitted. The output of the IN USE trigger 905 is fed through the inverter 909 to signify a service request to AND circuit 910. This SERVICE REQUEST signal is gated with TERMINAL AVAILABLE signal, from TERMINAL AVAILABLE TRIGGER 816, in AND gate 910. If both of these signals are up the AND gate 910 produces a signal indicating that service should be granted to terminal A01. The output of EXCLUSIVE OR gate 908 is gated against the CHARACTER REGISTER OK signal from decoder 815 to produce the TRANSFER INFORMATION TA01 signal. This signal is in turn ORed with the output of AND gate 910, in OR gate 912, to produce the TA01 REQUIRES SERVICE signal. The output of AND gate 911 gates clock bits through AND gate 913 to produce the bit sample pulses for A01.

*Twenty terminal group A control, FIGURE 10*

Figure 10B:
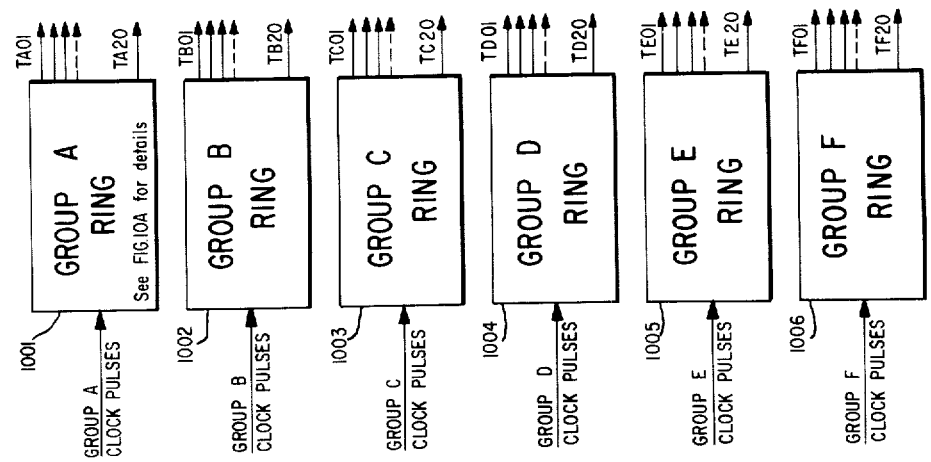

Each group of 20 terminals is addressed by a 20 position closed ring as shown in FIGURES 10A and 10B. The 20 position closed ring 1001 is provided to address the terminals in group A. Similarly, the rings 1002–1006 shown in FIGURE 10B, are provided to address groups B through F. The details of ring 1001 are shown in FIGURE 10A, it being understood that the remainder of the rings 1002–1006 are identical. The 20 position ring shown in FIGURE 10A and the 6 position ring shown in FIGURE 11 jointly address the terminals. The 6 position ring of FIGURE 11 steps through the 6 groups of terminals and the 20 position ring of FIGURE 10 steps through the 20 terminal positions of each group. Each of the rings in FIGURE 10 will be advanced once each time the 6 position ring of FIGURE 11 has gone through one cycle.

The 20 position ring 1001 of FIGURE 10A includes the usual five triggers 1007–1011, AND gates 1012–1019 for gating the clock pulses to the appropriate trigger and AND gates 1020–1039 for decoding the conditions of triggers 1007–1011 and producing the signals TA01, TA02, TA03 . . . TA20 for addressing the 20 terminals of Group A. As the ring 1001 steps through the trigger stages 1007–1010, different ones of the AND gates 1020–1039 will have up conditions on the top four inputs to that AND gate. The code has been designed to require only four legs for each AND gate 1020–1039. The fifth input to each AND gate is the TERMINAL REQUIRES SERVICE signal. For example, the fifth input to AND gate 1020 is the TERMINAL A01 REQUIRES SERVICE signal from OR gate 912 in FIGURE 9. If this fifth input to the AND gate is up, the output of the AND gate goes up and forms the Group A ACTIVE signal through certain ones of the OR gates 1040–1043. The Group A ACTIVE signal fires the single-shot 1044 which means in its unstable condition for 2.5 milliseconds, the time required to service a terminal requesting service. While the single-shot 1044 is in its unstable state, the AND gate 1045 is inhibited thus prohibiting any further Group A clock pulses from passing through AND gate 1045 to step the 20 position ring 1001 to the next stage.

*Six group control, FIGURE 11*

The 6-position ring shown in FIGURE 11 includes the usual trigger stages 1101–1106 and AND gates 1107–1112 for decoding the status of the triggers. The ring is stepped by a source of 10 microsecond SIX GROUP CLOCK PULSES.

The stepping of the rings in FIGURE 10 and FIGURE 11 is as follows. Assume that the terminal F20 has just been interrogated; that is, the line TF20 on FIGURE 10B is in the up condition. The ring circuits are ready to start a new cycle of terminal scanning. The trigger 1101 is in the ON condition and the remainder of the triggers 1102–1106 are in the OFF condition. The next 10 microsecond clock pulse passes through AND gate 1107 and through AND gate 1045 since we are assuming that Group A is not presently active, that is, no terminals in Group A are being serviced. The output of AND gate 1045 steps triggers 1007–1011 to positions such that the top four inputs to AND gate 1020 are up. Assuming that terminal A01 is requesting service, the output of AND gate 1020 is up and a Group A ACTIVE signal is produced which fires the single-shot 1044 inhibits AND gate 1045 for 2.5 milliseconds. However, the first clock pulse that did pass through AND gate 1045 to set the triggers to interrogate AND gate 1020 also turns off trigger 1101 and turns on trigger 1102 in FIGURE 11. Since trigger 1102 is now on, the next ten microsecond clock pulse will pass through AND gate 1108 and will step the Group B ring 1002 to a position such that terminal B01 is interrogated. This second clock pulse turns off trigger 1102 and turns trigger 1103 on. The third clock pulse passes through AND gate 1109 to condition the Group C ring to interrogate terminal C01. The clock pulses continue and, assuming that no terminals in the Groups B, C, D, E, F are requesting service, successive 10 microsecond clock pulses will interrogate terminals TD01, TE01, and TF01. As terminal TF01 is interrogated, the trigger 1101 is turned back on and the next 10 microsecond clock pulse passes through AND gate 1107 to the AND gate 1045. However, AND gate 1045 is blocked since the single-shot 1044 has been fired as a result of the servicing of Terminal TA01. Ten microsecond clock pulses will continue to pass through AND gate 1107 but will be blocked by AND gate 1045 until 2.5 milliseconds has elapsed at which time the single-shot 1044 returns to its stable condition, the next 10 microsecond clock pulse passes through AND gate 1045 and the stepping of the rings continues. The result is that the terminals are interrogated in the following order: A01, B01, C01, D01, E01, F01, A02, B02, C02 . . . D20, E20, F20, A01 . . . . Normally, ten microseconds elapses between the interrogation of successive terminals. However, when one of the terminals requires service, the interrogation will continue at 10 microsecond intervals only until the interrogation proceeds to the next terminal in the group in which a terminal is presently being serviced. At this point the interrogation stops until 2.5 milliseconds has elapsed from the time at which the busy terminal was first interrogated. After 2.5 milliseconds, the interrogation continues. The resultant two-speed scan is conservative of time since the scanning proceeds at a high speed until a terminal requiring service is found. Also, this type of scanning permits the scanning to proceed at a high rate through many different groups until a terminal requiring service is found.

The signals TA01, TA02–TF20 produced by the rings in FIGURE 10 are used to gate information from the terminals, over the information lines to the group character register or from the group character register over the information line to the terminal. Referring to FIGURE 8, AND gates 830–838, and others, are sampled by the signals TA01–TF20 to gate information lines and character registers. These signals are also fed to computer 814 so that the computer is signalled that the corresponding terminals are presently being serviced.

Figure 12:
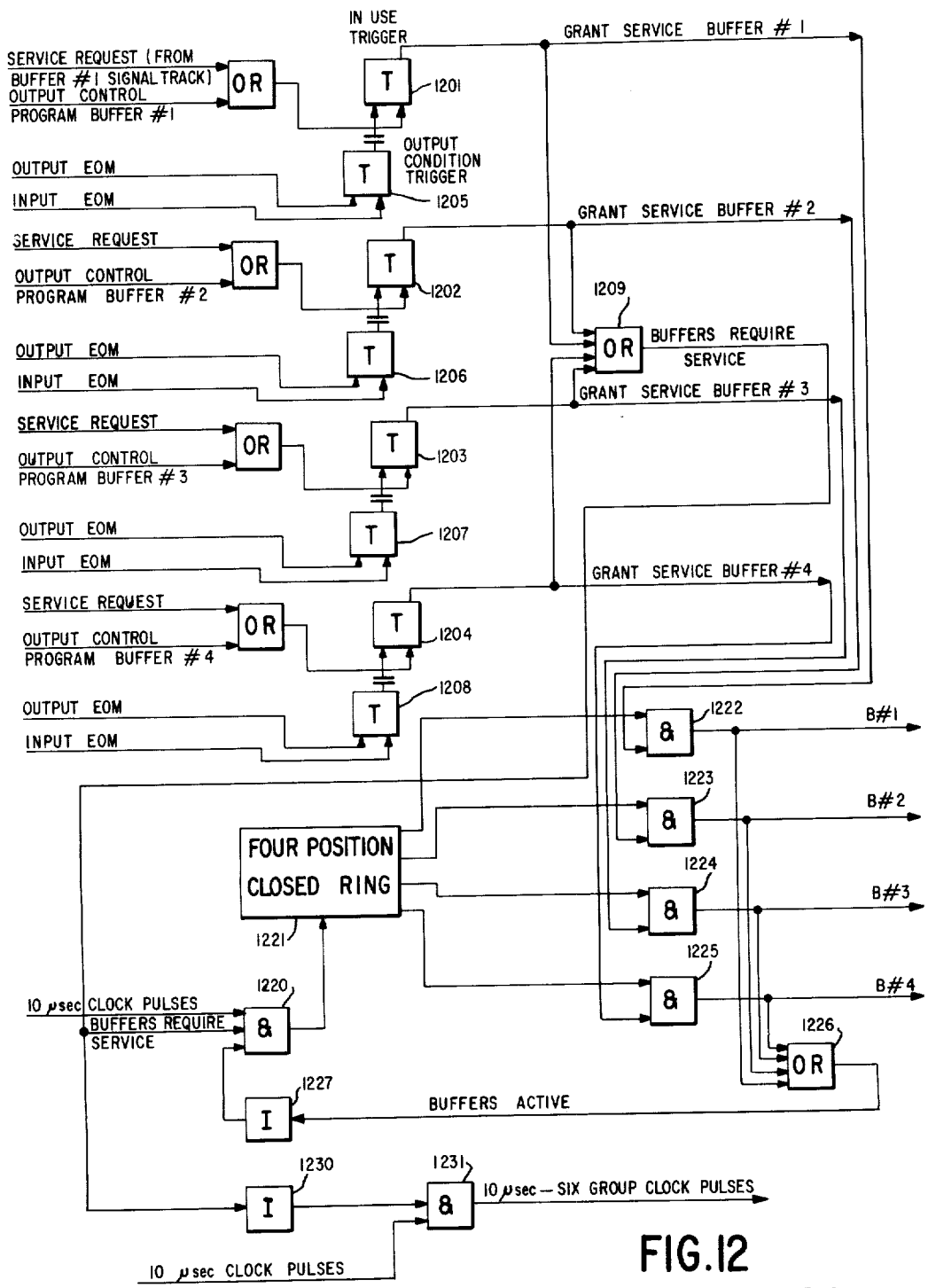
FIGURE 12 shows the buffer sample controls.

*Buffer interrogation equipment, FIGURE 12*

Scanning and control of the buffered terminals differ in two respects from the control of the unbuffered terminals. First, a terminal identification must be transmitted with each group of ten characters. Secondly, there is a strict time dependence in the transmission of the characters within a group. That is, once transmission of a group has started it must be continued at regular intervals. This requires that the buffered terminals have some sort of limited priority over the directly connected terminals. As a result, the controls for the buffered terminals act as a master control to interweave the scanning of the buffered and unbuffered terminals even though buffered terminals are a relatively less important part of the entire system.

Referring to FIGURE 12, each buffer has an IN USE and an OUTPUT CONDITION trigger similar to the triggers associated with each of the unbuffered terminals. The IN USE triggers 1201–1204 are associated with buffers 1, 2, 3, and 4 respectively. The OUTPUT CONDI- TION triggers 1205–1208 are associated with buffers 1, 2, 3, and 4 respectively. Each of the IN USE triggers may be set on by a SERVICE REQUEST from the signal track of the associated buffer or by an output control program signal from the computer indicating that the computer has an output message ready for that buffer. These signals are applied through OR circuits to the on input of each of the IN USE triggers 1201–1204. The OUTPUT CONDITION triggers indicate whether the buffer is in an input or output mode. The outputs of all IN USE triggers 1201–1204 are ORed in OR gate 1209, the output of which indicates that one of the buffers requires service. When this signal is up, a scan of all of the buffers in sequence will begin.

When the BUFFERS REQUIRE SERVICE signal is up, the AND gate 1220 is unblocked and 10 microsecond clock pulses are fed through this AND gate to the four position closed ring 1221. The four position closed ring 1221 is of the usual type in which each of the four output lines is successively raised upon the occurrence of successive input clock pulses. The four position ring 1221 successively samples AND gates 1222–1225. If the IN USE trigger 1201 associated with buffer 1, is on at the time that AND gate 1222 is sampled, then the output of AND gate 1222 goes up thus producing the B#1 signal. Similarly, as the four position closed ring scans the remainder of the IN USE terminals, B#2, B#3, and B#4 signals may be produced if any of these buffers require service. These signals are ORed in OR gate 1226 to produce the BUFFERS ACTIVE signal. This signal is inverted in inverter 1227 and applied as one input to AND gate 1220. When the BUFFERS ACTIVE signal is up, clock pulses will be inhibited from passing through AND gate 1220 to step the four position closed ring 1221. Thus, stepping of the four position closed ring is inhibited until the buffer presently being serviced has been completely serviced, the IN USE trigger turned off and the corresponding B# signal has gone down. When all of the buffers showing a GRANT SERVICE BUFFER # signal have been completely serviced, the buffers REQUIRE SERVICE signal goes down and the stepping of closed ring 1221 stops.

The signals B#1-B#4 are used to gate information from the input and output lines to the buffers into the BUFFER CHARACTER REGISTERS. Referring to FIGURE 8, the input lines from the four buffers are connected through AND gates 820–823 to the TEN CHARACTER BUFFER INPUT register 824. Similarly, messages from the TEN CHARACTER BUFFER OUTPUT register 825 are gated to the buffer output lines through AND gates 826–829.

In order to interweave the scanning of the directly connected terminals and the scanning of the buffered terminals, the BUFFERS REQUIRE SERVICE signal is inverted in inverter 1230 and applied to AND gate 1231. Ten microsecond clock pulses pass through AND gate 1231 only when none of the buffers requires service. The output of AND gate 1231, 10 microsecond SIX GROUP CLOCK PULSES are connected to AND gates 1107–1112 in FIGURE 11 in order to step the six position closed ring used to scan the unbuffered terminals. Thus, whenever any of the buffered terminals require service, the scanning of the unbuffered terminals ceases until all buffers showing a GRANT SERVICE signal have been serviced.

Figure 13:
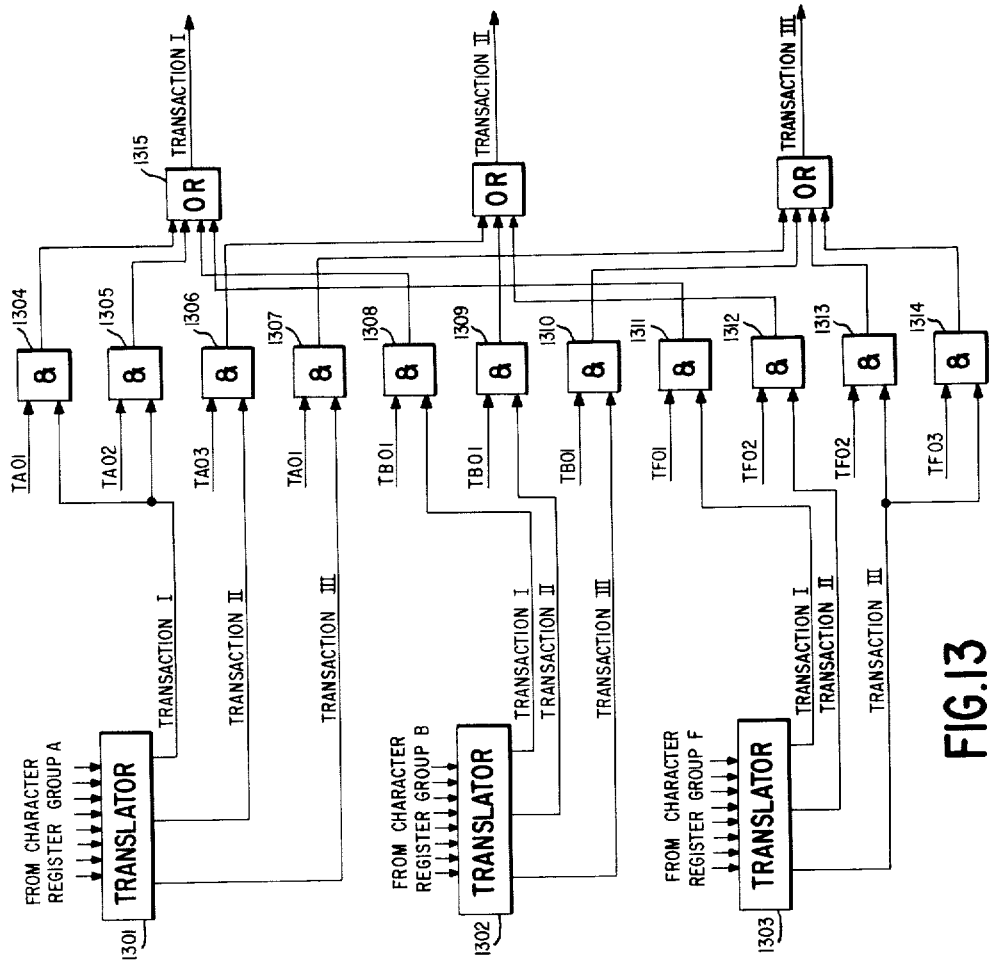
FIGURE 13 shows the "right-to-know" circuitry.

*Right to know, FIGURE 13*

In an integrated data processing system in which a plurality of local terminals are connected to a central system containing all of the pertinent information about the organization, the "right to know" of each remote terminal becomes an important consideration. Information stored at the central computer must be completely safeguarded against unauthorized and incorrect change. In order to provide such safeguards, the transactions at the central computer that can be initiated at each remote station are limited. That is, remote terminals located in the payroll department can initiate only those transactions dealing with payroll information and remote terminals located at the production department can initiate only those programs in the central computer which concern themselves with production data. Some remote terminals, of course, will be allowed to initiate all computer transaction programs and have access to all information in the computer. The first character transmitted on each input message will be a transaction character specifying the program that the central computer is to follow. In order to insure that the remote terminals initiate only those transactions which are authorized, the circuitry of FIGURE 13 is provided.

A transaction character translator is provided for each of the CHARACTER registers shown in FIGURE 8. For example, a translator 1301 is associated with CHARACTER REGISTER GROUP A, 801, a translator 1302 is associated with CHARACTER REGISTER GROUP B, 802, and a translator 1303 is associated with CHARACTER REGISTER GROUP F, 811. These translators produce outputs when the characters requesting particular transactions are set in the corresponding CHARACTER register. In the very simple embodiment shown in FIGURE 13, it is assumed that the translators will recognize characters corresponding to only three transactions, Transaction I, Transaction II and Transaction III. The AND gates 1304–1314 are provided to match up the transaction requested with the terminal requesting the transaction to insure that the terminal is authorized to initiate such a transaction. The AND gates 1304–1314 are gated by the signals TA01–TF20 from FIGURE 10. In the embodiment shown, if the translator 1301 recognizes the Transaction I character, thus raising the Transaction I line at the same time that the terminal A01 is being serviced, the signal TA01 is up, then the output of AND gate 1304 is up and the Transaction I signal is produced through OR gate 1315. The output of OR gate 1315 is connected to the computer and when the output is up, Transaction I is initiated by the computer. Similarly, if the Transaction I signal from the translator 1301 is up at the same time that terminal A02 is being serviced, then the output of AND gate 1305 goes up and again the OR gate 1315 initiates Transaction I in the computer. If, however, the Transaction I signal from translator 1301 was up at the time that terminal A03 was being serviced, the Transaction I would not be initiated since there is no provision to authorize initiation of such a transaction from terminal A03. The remainder of the AND gates 1306–1314 allow the following transactions to be initiated from the following terminals: A03 may initiate Transaction II; A01 may initiate Transaction III; B01 may initiate Transaction I; B01 may initiate Transaction II; B01 may initiate Transaction III; F01 may initiate Transaction I; F02 may initiate Transaction II; F02 may initiate Transaction III; and F03 may initiate Transaction III.

The embodiment shown in FIGURE 3 is, of course, highly diagrammatic and in practice the provision for "right to know" will be much more complex.

While the invention has been particularly shown and described with reference to a preferred embodiment thereof, it will be understood by those skilled in the art that various changes in form and details may be made therein without departing from the spirit and scope of the invention.

What is claimed is:

1. An integrated data processing system comprising a central computer, a plurality of remote terminals, each of said remote terminals including an input/output device, said input/output devices being adapted to transmit messages to or receive messages from said central computer, first ones of said remote terminals being directly connected to said central computer, means associated with each directly connected terminal for generating a terminal service request signal when there is a message to be transmitted to or from a particular remote terminal, a plurality of buffers, others of said remote terminals being connected by groups to said central computer through said buffers, a different group of said other terminals being connected through each of said buffers, means for generating a buffer service request signal at any buffer when there is a message to be transmitted to or from a terminal connected to said buffer, direct terminal scanning means for successively scanning each of said directly connected terminals to detect the presence of a terminal service request signal, normally inoperative means for successively scanning said buffers to detect the presence of a buffer service request signal, control means effective after the scanning of each of said directly connected terminals to respond to the presence of a buffer service request signal for any one or more of said other remote terminals, for interrupting the operation of said direct terminal scanning means and initiating an operation of said buffer scanning means, said control means being responsive to the termination of the last buffer service request signal to restore the operation of said direct terminal scanning means and to stop the operation of said buffer scanning means, and means responsive to the detection by either of said scanning means of a service request signal for transferring information between said central computer and the remote terminal to which said detected service request signal pertains.

2. The system recited in claim 1 wherein each directly connected terminal is connected to said central computer by an information line and a bit sample line, and the means responsive to the detection of a service request signal includes means at the central computer for transmitting bit sample pulses over the bit sample line of the terminal requesting service and means at the remote terminal responsive to said bit sample pulses for transferring a message between said terminal and said central computer over said information line.

3. The system recited in claim 1 wherein the means for scanning each of said directly connected terminals provides a first scan time in scanning a terminal in the absence of a terminal service request signal and a second, longer, scan time in scanning a terminal in the presence of a terminal service request signal.

4. The system recited in claim 1 wherein said central computer comprises a plurality of character registers each connected to a group of said directly connected terminals, said means for transferring information between said central computer and said remote terminals including gating means, said gating means being connected to transfer message characters between each of said character registers and any selected one of the directly connected terminals associated therewith, said gating means being responsive to said means for scanning said directly connected terminals.

5. The system recited in claim 1 wherein each of said buffers includes a cyclical memory, said cyclical memory having an input section and an output section, said input section and said output section being divided into a plurality of sectors, means for gating all characters of a message to be transmitted from each remote terminal to said central computer to a particular input sector associated with that remote terminal, and means for gating all characters of messages to be transmitted from said central computer to each remote terminal to a particular output sector associated with that remote terminal.

6. The system recited in claim 5 wherein each of said other terminals are connected to an associated buffer by an information line and a bit sample line, each of said buffers being connected to said central computer by an input line and an output line, means for selectively connecting each of the bit sample lines and each of the information lines to said buffer, means for selectively connecting each of said output lines to different ones of said output sectors, means for reading characters into said output sectors from said output line, means for selectively connecting each of said input lines to different ones of said input sectors and means for reading characters out of said input sectors onto said input line.

7. The system recited in claim 6 wherein each of said cyclical memories further includes a signal section, a sector timing section, and a bit timing section, said signal section having characters identifying particular sectors permanently stored therein, said permanently stored characters being stored in portions of said signal track associated with particular ones of said sectors, means for storing a mark in each of said portions indicative of the fullness condition of the associated sector, means for reading said signal track, said means for gating characters to particular input sectors being responsive to said last named reading means, said sector timing section containing permanently recorded marking indicating the beginning and end of each of said sectors of said cyclical memory, means for reading said sector timing track, said means for selectively connecting each of said information lines and each of said bit sample lines to said buffer being responsive to said last named reading means, said bit timing section having permanently recorded therein a plurality of marks for each of said sectors, means for reading said bit timing section, the output of said last named reading means being controlled by said means for selectively connecting each of said bit sample lines to said buffer to selectively connect said output to each of said bit sample lines.

8. The system recited in claim 4 wherein each message contains a character designating a transaction which said central computer is to perform, gating means for initiating each of said transactions in said computer, a decoder associated with each of said character registers, said decoder producing signals indicative of the transaction requested in a particular message, said gating means being responsive to the outputs of each of said decoders and the output of said terminal scanning means whereby each of said remote terminals may initiate certain transactions only on a "right-to-know" basis.

9. An integrated data processing system comprising:
a central computer;
a plurality of primary remote terminals each including input/output means for directly connecting the respective terminal to said central computer, said input/output means being adapted to transmit messages in either direction between said central computer and the respective primary terminal;
means associated with each of said primary terminals for generating a primary terminal service request signal indicating a requirement for the transmission of a message in either direction;
a plurality of secondary terminals;
means including input/output means for each secondary terminal and a number of buffers smaller than the number of said secondary terminals, for connecting said secondary terminals by groups to said central computer through respective group buffers, for transmission of messages in either direction between a secondary terminal and said computer;
a first buffer signal means pertaining to each of said buffers for indicating, for each buffer, a service requirement of any of the secondary terminals in the group pertaining to the respective buffer;
second buffer signal means controlled by any one or more of said first buffer signal means for generating a buffers-require-service signal whenever at least one of said secondary terminals requires service and for extinguishing said last mentioned signal when the last of said secondary terminals requiring service has been serviced;
primary scanning means for scanning, in succession, said primary terminal service request signal means;

normally inhibited means adapted, when operative, to scan said buffers in sequence for individual buffer-service-requirement signals;

control means operable after the scanning of each directly connected terminal and responsive to a buffers-require-service signal from said second buffer signal means existing at that time, for disinhibiting said buffer scanning means and interrupting the operation of said primary scanning means, said control means being adapted to restore the inhibition of said buffer scanning means and to terminate the interruption of said primary scanning means when said buffer-require-service signal from said second buffer signal means disappears, and means responsive to the detection of a service request signal by either of said scanning means for transferring information between said central computer and remote terminal for which the service request signal was generated.

References Cited by the Examiner
UNITED STATES PATENTS

| | | | |
|---|---|---|---|
| 3,037,191 | 5/1962 | Crosby | 340—172.5 |
| 3,063,036 | 11/1962 | Reach | 340—172.5 |

ROBERT C. BAILEY, *Primary Examiner.*

MALCOLM A. MORRISON, *Examiner.*